Aug. 9, 1938.　　　G. T. RANDOL　　　2,126,032
MOTOR VEHICLE TRANSMISSION CONTROL
Filed July 30, 1935　　　9 Sheets-Sheet 3
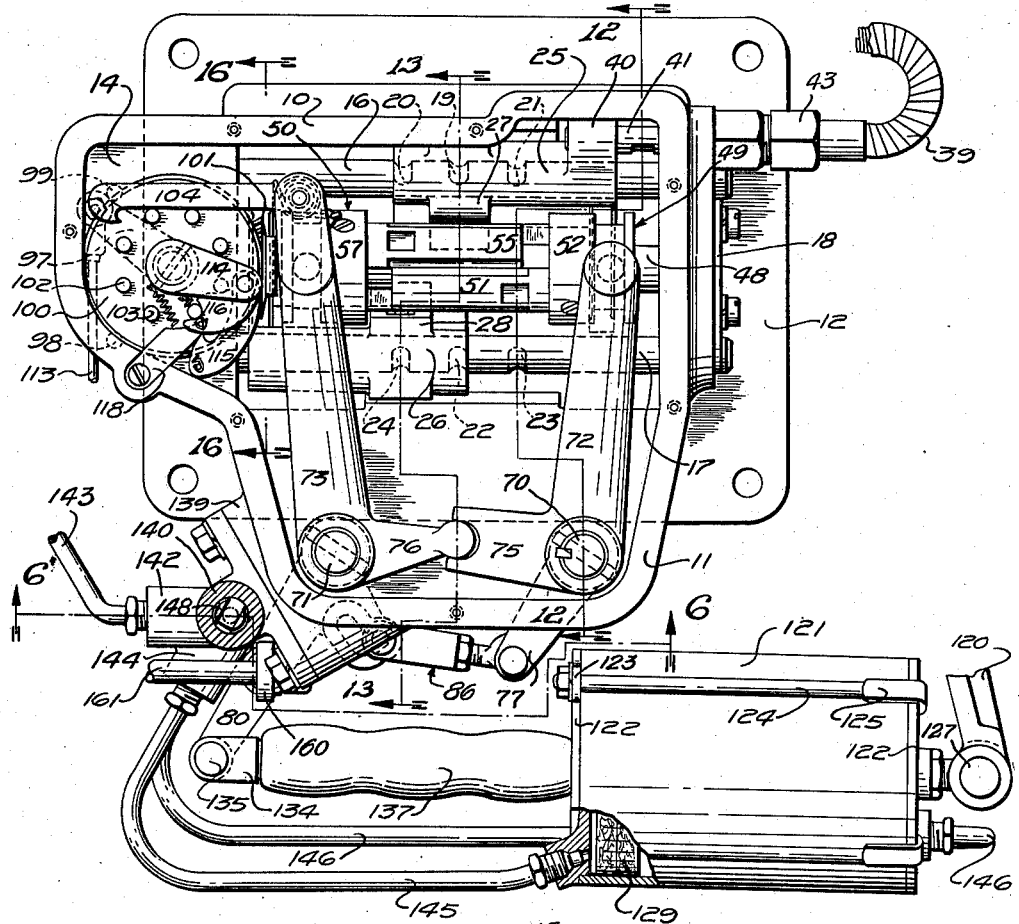
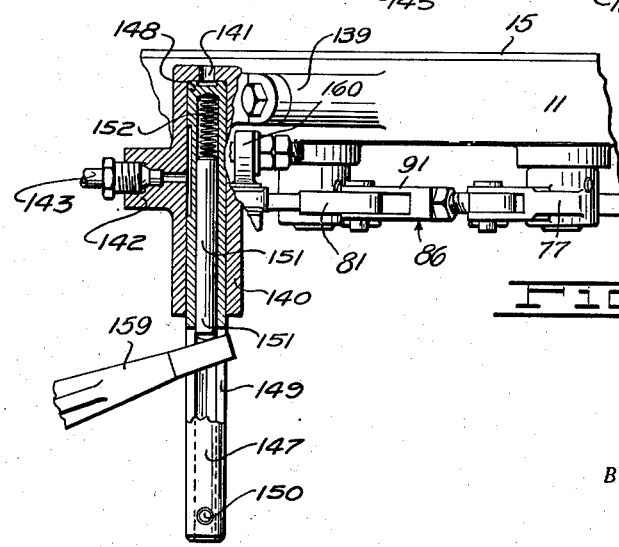
INVENTOR.
G. T. Randol
BY
ATTORNEY.

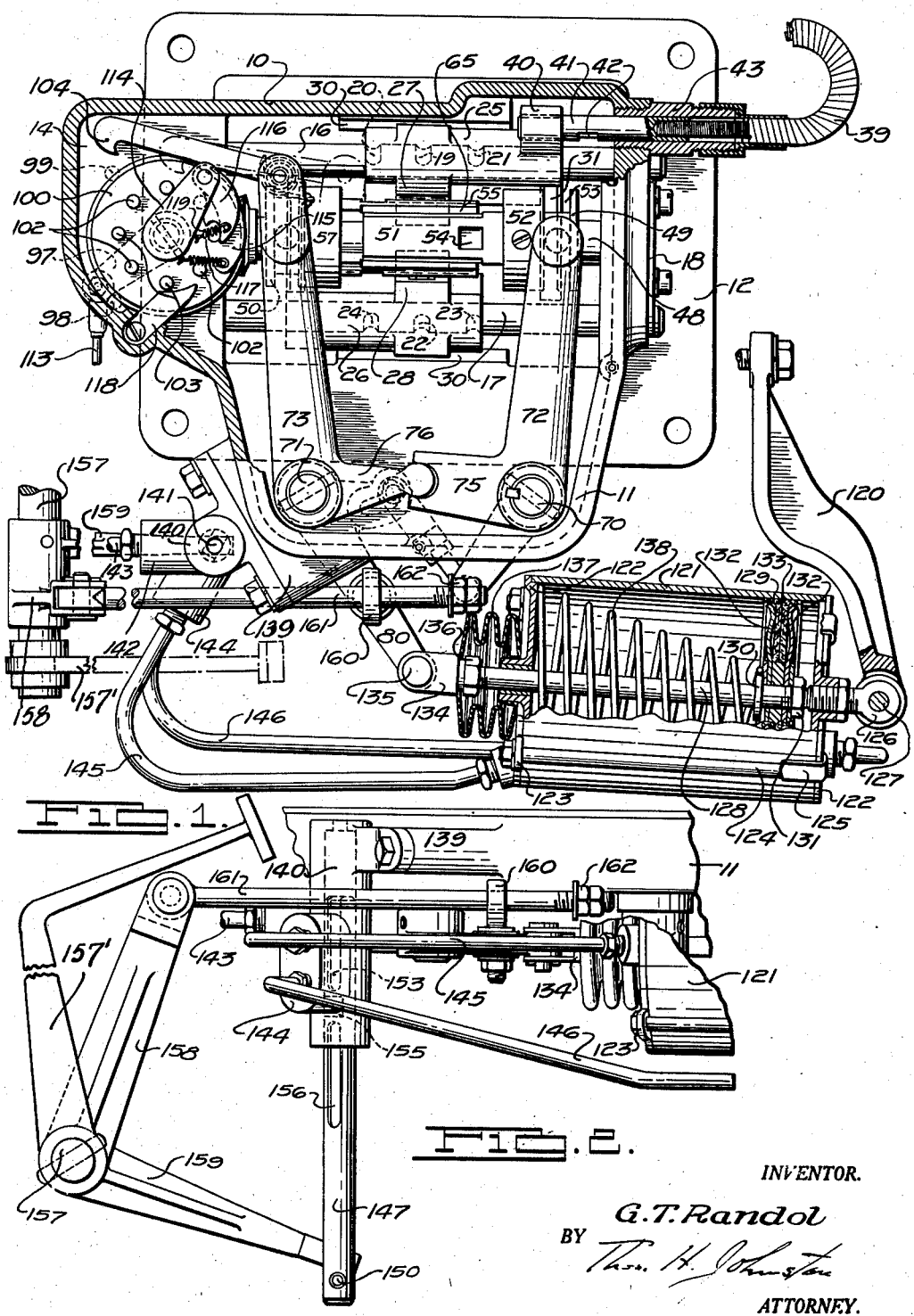

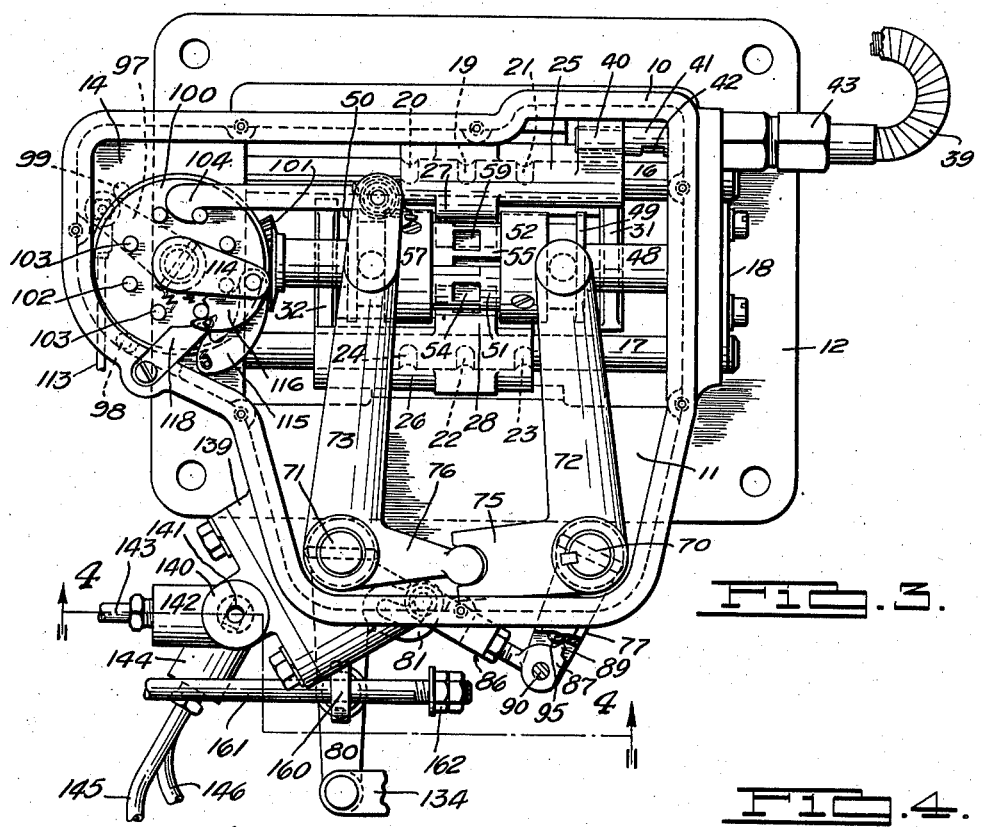
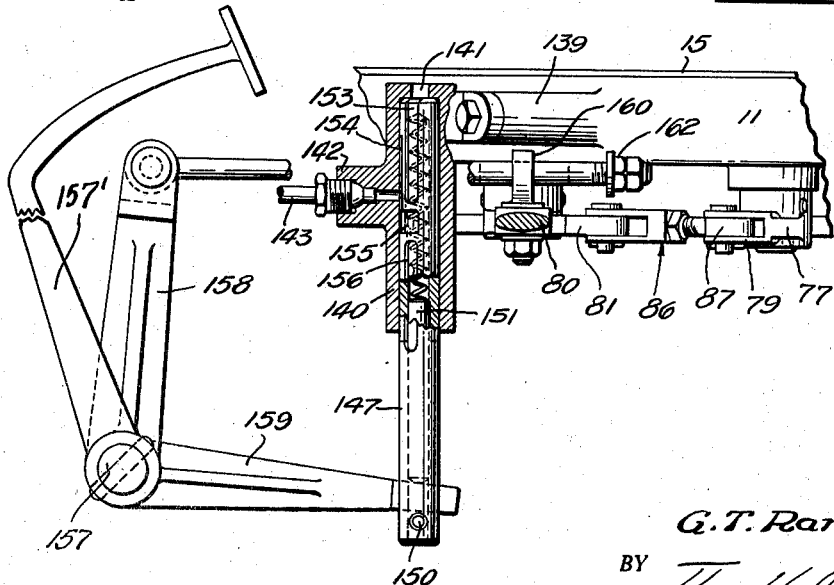

Aug. 9, 1938.　　　G. T. RANDOL　　　2,126,032
MOTOR VEHICLE TRANSMISSION CONTROL
Filed July 30, 1935　　　9 Sheets-Sheet 4
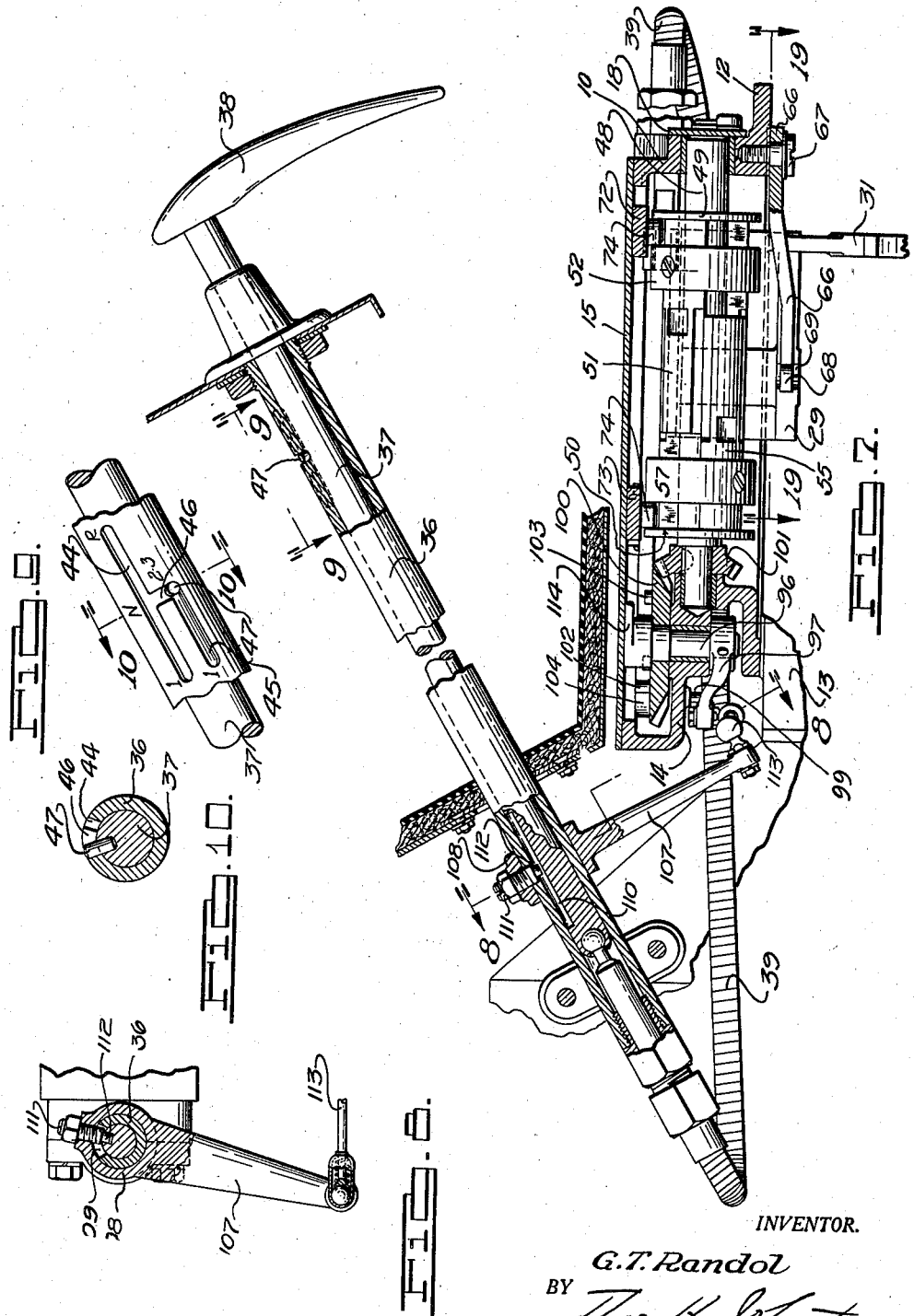
INVENTOR.
G. T. Randol
BY
ATTORNEY.

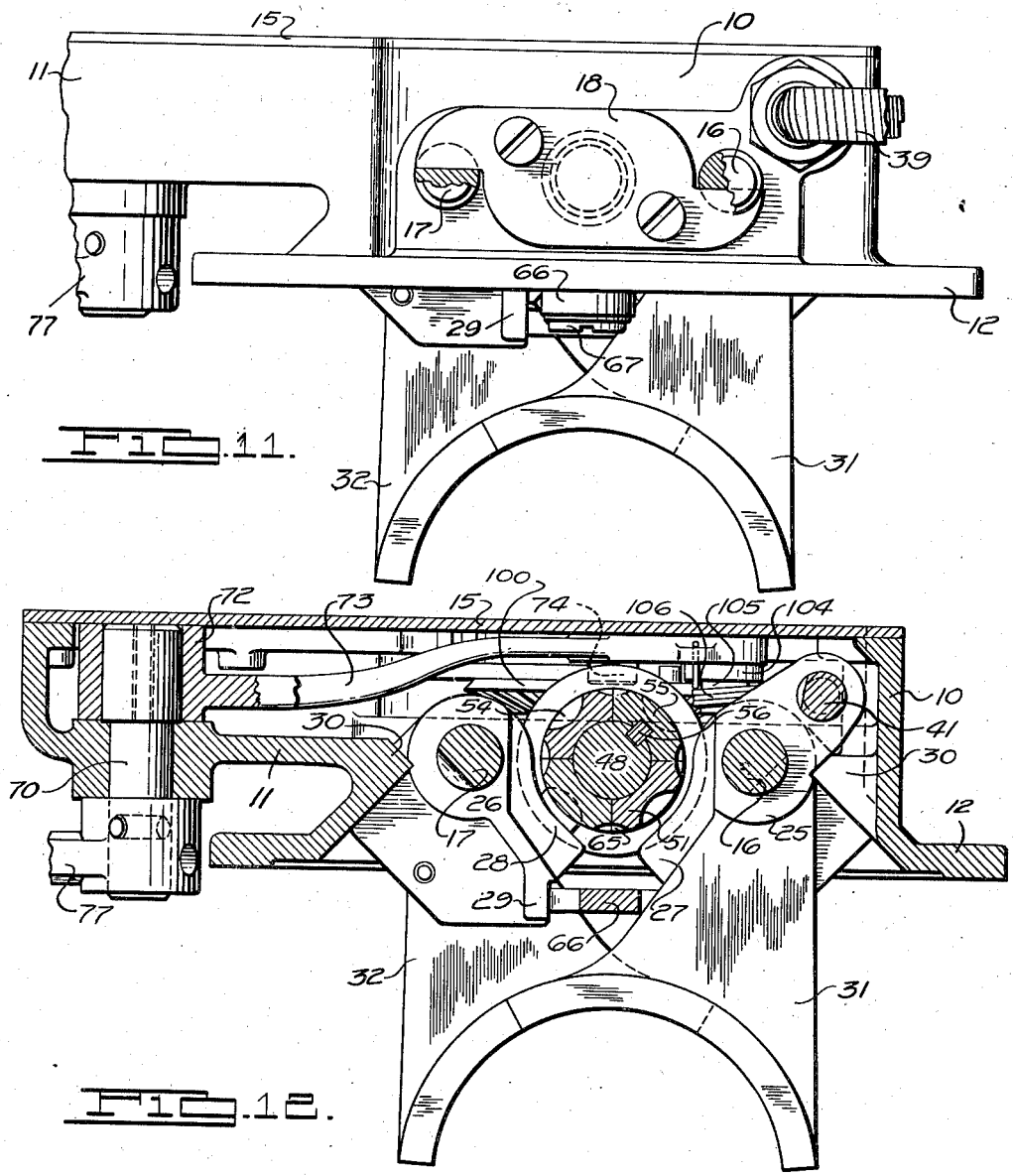

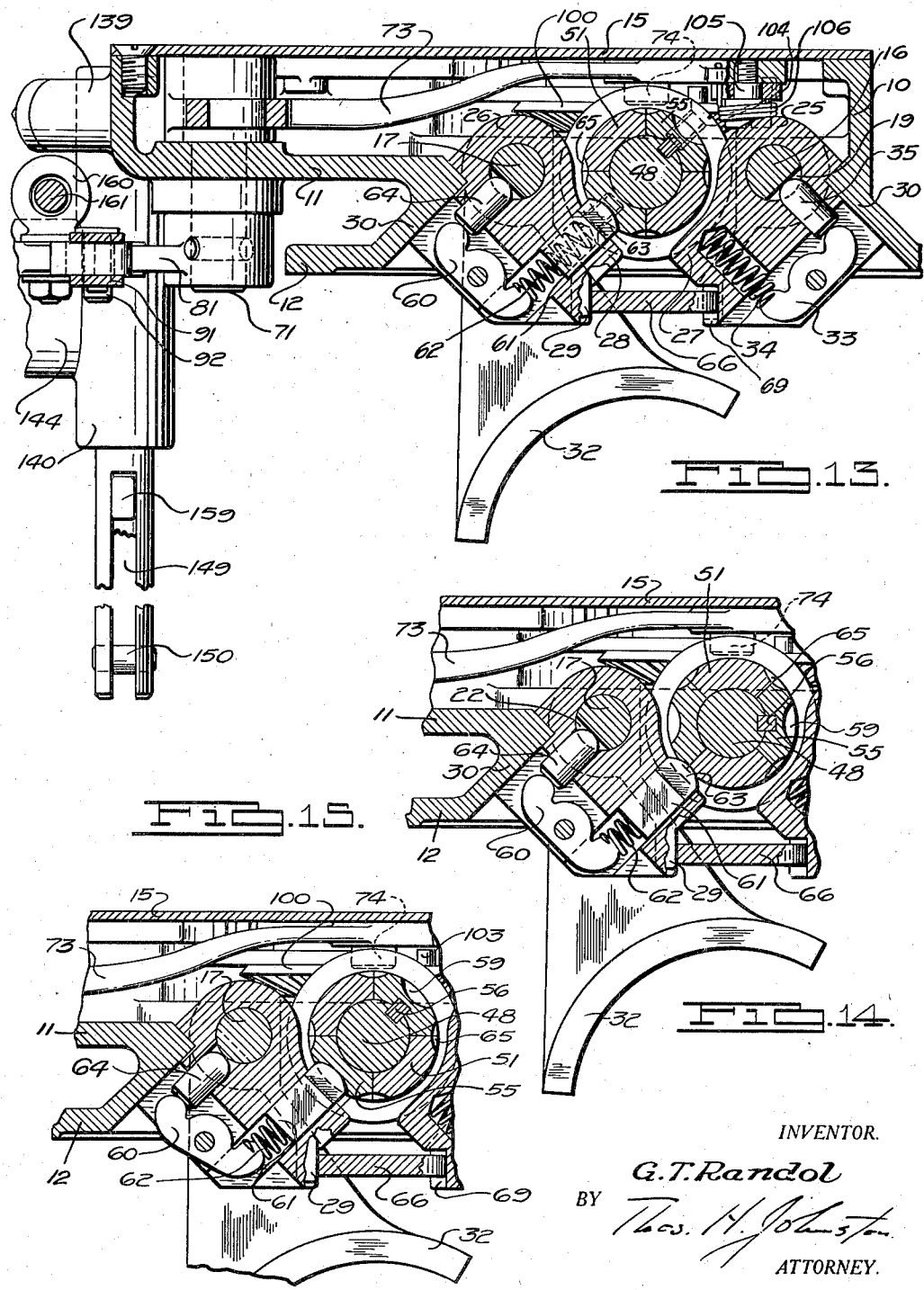

Aug. 9, 1938. G. T. RANDOL 2,126,032
MOTOR VEHICLE TRANSMISSION CONTROL
Filed July 30, 1935 9 Sheets-Sheet 7
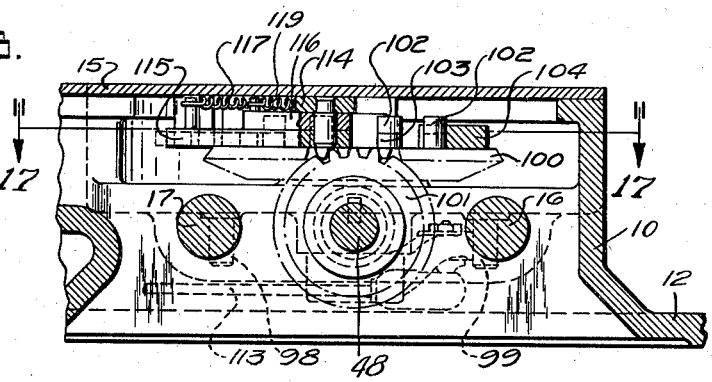
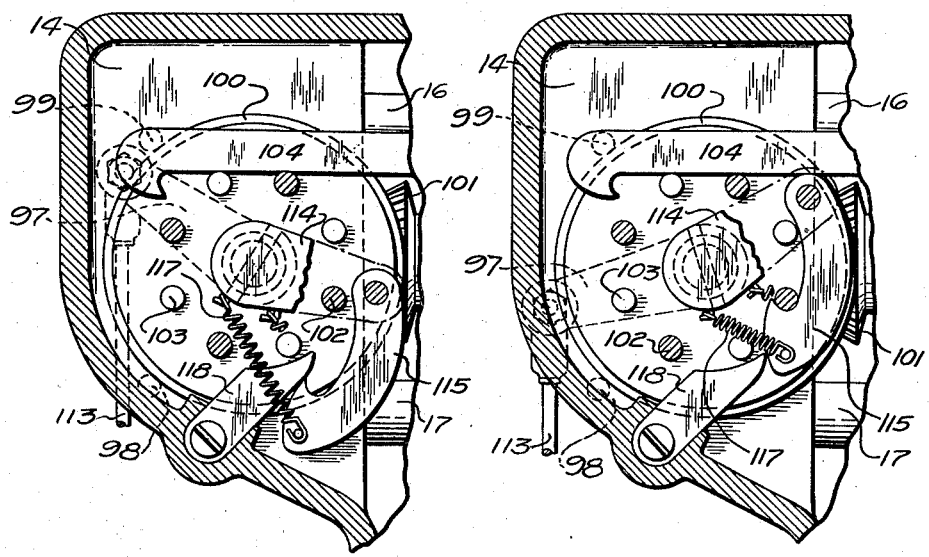
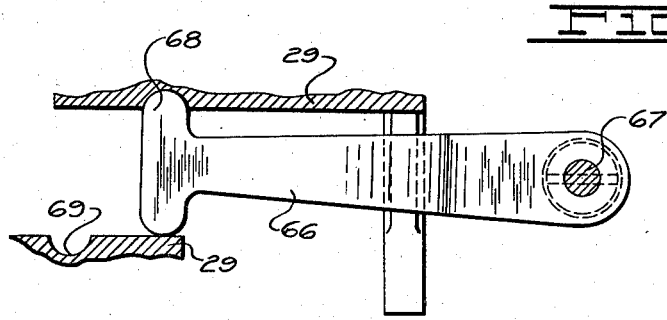
INVENTOR.
G. T. Randol
BY Thos. H. Johnston
ATTORNEY.

Aug. 9, 1938.  G. T. RANDOL  2,126,032
MOTOR VEHICLE TRANSMISSION CONTROL
Filed July 30, 1935  9 Sheets-Sheet 8

INVENTOR.
G. T. Randol
BY
Thos. H. Johnston
ATTORNEY.

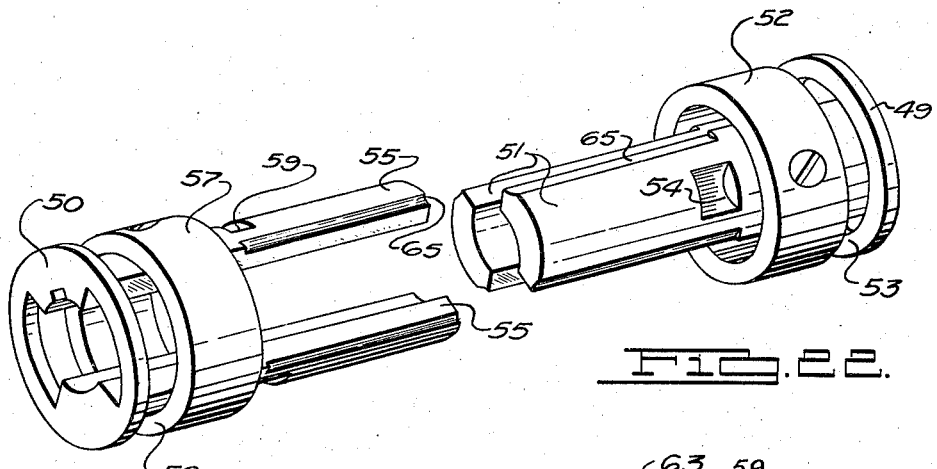
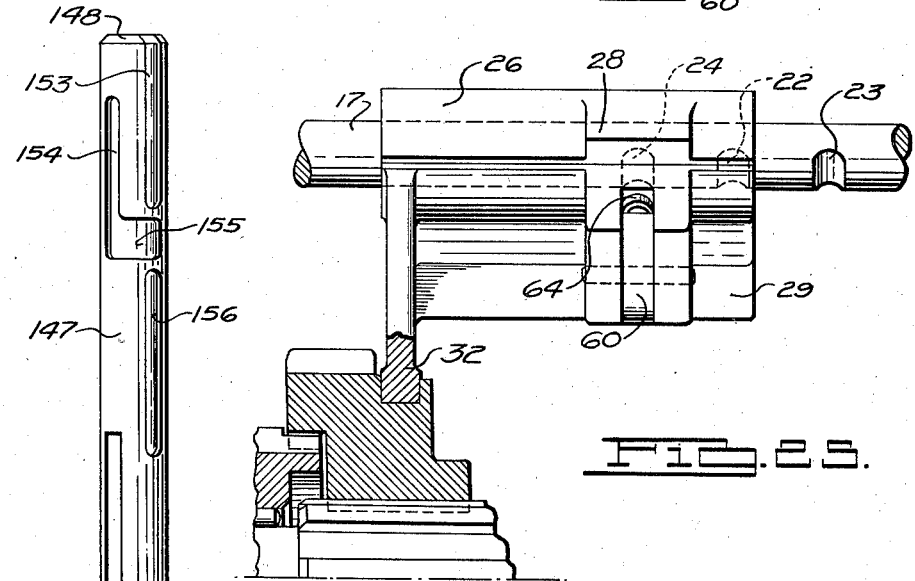

Patented Aug. 9, 1938

2,126,032

UNITED STATES PATENT OFFICE 2,126,032

MOTOR VEHICLE TRANSMISSION CONTROL

Glenn T. Randol, Marmaduke, Ark.

Application July 30, 1935, Serial No. 33,900

71 Claims. (Cl. 74—334)

This invention relates to an improved motor vehicle transmission control of the general character disclosed in Patent No. 1,687,591 issued to me October 16, 1928.

The invention seeks, as a salient object, to provide a mechanism wherein a single initial setting of the control handle will serve for all forward speeds beginning either with low or second speed and wherein, after reaching high speed, subsequent automatic operation of the mechanism will cause the two highest speeds, namely, second and high, to alternately function until neutralized or until low speed is again rendered active, following which latter the same cycle of successive operations will again occur, thereby reducing the necessity for manual manipulation on the part of the driver to a minimum.

A further object of the invention is to provide a mechanism wherein a single hand operation will serve to render reverse active and also wherein a single hand operation will serve to set the mechanism for neutral, which neutral setting is effective for and common to all speeds.

The invention seeks, as another object, to provide a mechanism wherein low and reverse may be selected and rendered active by manually operable means exclusively; wherein low and reverse may be neutralized manually or automatically by power actuated means and wherein, if so desired, the power actuated means may be employed to assist the manually operable means in neutralizing either low or reverse.

The invention seeks, as a further object, to provide a mechanism which may be manually set to automatically select second speed and high speed successively; wherein both speeds may be successively rendered active or neutralized exclusively by power actuated means, automatically, and wherein the usual clutch pedal may, if so desired, be actuated to supplement the power actuated means in rendering either speed active or inactive.

Still another object of the invention is to provide a mechanism which, after being manually set, will automatically function to select second speed and render said speed operative; wherein upon the ensuing actuation of the mechanism, second speed will be automatically neutralized and high speed automatically selected and rendered active; wherein upon the ensuing actuation of the mechanism high speed will be automatically neutralized and second speed automatically selected and again rendered active, the functioning of the mechanism being such that as long as it remains set to operate automatically, second and high will indefinitely be alternately selected and rendered active.

The invention seeks, as a further object, to provide a mechanism which, when set to function automatically, will select a future speed coincidentally with the neutralizing of a previously active speed and wherein, while so set and any speed is active, the mechanism may be manually set to be automatically neutralized upon the ensuing operation thereof.

A further object of the invention is to provide a mechanism wherein, when manually set to function automatically, second speed will always be initially selected and rendered active automatically so that second speed will always be caused to function prior to the use of high speed.

A further object of the invention is to provide a mechanism wherein all speeds may be automatically neutralized.

Still another object of the invention is to provide an improved power actuated toggle mechanism through which the force will be transmitted for rendering active second and high speeds or neutralizing all speeds; wherein the toggle will, during the first half of its active throw, impart a movement of gradually diminishing speed to the gear being neutralized but conversely, during the second half of its active throw will impart a movement of gradually increasing speed to a selected gear being rendered active while, as the toggle crosses dead center, the parts affected will be caused to momentarily pause to permit the usual gear synchronizing mechanism to function prior to positive engagement of a selected gear and wherein the toggle may be adjusted to suit the axial gear travel of different transmissions as well as to compensate for wear.

And the invention seeks, as a still further object, to provide a mechanism adapted to supplant the present hand control assembly of conventional types of sliding gear and constant mesh transmissions, the present mechanism being such that the control of the various speeds is dependent upon the will of the driver, thereby enabling the driver to keep the performance of the vehicle at a point of maximum efficiency and economy of operation, which features are greatly sacrificed through the use of the more expensive and complicated types of so called automatic transmissions which utilize for their operation some characteristic of either engine or car performance.

Other and incidental objects of the invention not specifically mentioned in the foregoing will appear during the course of the following description and in the drawings which form part of this application.

Figure 1 is a plan view of my improved mechanism in neutral, parts being broken away and shown in section.

Figure 2 is a fragmentary side elevation showing the power control valve in normal position.

Figure 3 is a plan view showing the selector levers swung inwardly and high gear selected.

Figure 4 is a section on the line 4—4 of Figure 3 showing the control valve moved upwardly to admit suction to the forward end of the power cylinder and simultaneously admit air to the rear end of said cylinder.

Figure 5 is a plan view showing the selector levers swung outwardly and one of the shifters carried forwardly to render high gear active.

Figure 6 is a section on the line 6—6 of Figure 5 showing the floating pin of the valve which accommodates forward movement of the clutch pedal while the valve remains stationary.

Figure 7 is a longitudinal sectional view through the mechanism in neutral.

Figure 8 is a section on the line 8—8 of Figure 7.

Figure 9 is a fragmentary plan view showing the control slot as seen from the line 9—9 of Figure 7.

Figure 10 is a transverse section on the line 10—10 of Figure 9.

Figure 11 is a fragmentary rear elevation of the mechanism.

Figure 12 is a transverse section on the line 12—12 of Figure 5.

Figure 13 is a transverse section on the line 13—13 of Figure 5.

Figure 14 is a detail section showing the coupling plunger of one of the shifters engaged in a neutral groove of the selectors.

Figure 15 is a detail section showing the coupling plunger engaged in a socket of one of the selectors.

Figure 16 is a fragmentary section on the line 16—16 of Figure 5.

Figure 17 is a detail section on the line 17—17 of Figure 16 particularly showing the ratchet mechanism and one of the setting pawls therefor.

Figure 18 is a detail section showing the setting pawl of Figure 17 engaged with one of the pins of the ratchet.

Figure 19 is a detail section on the line 19—19 of Figure 7.

Figure 22 is a perspective view of the selectors.

Figure 23 is a detail section particularly showing the coupling plunger.

Figure 24 is a fragmentary detail elevation of the control valve, and

Figure 25 is a detail view partly in section and partly in elevation particularly showing the outer side of the high and second gear shifter.

Figure 20:
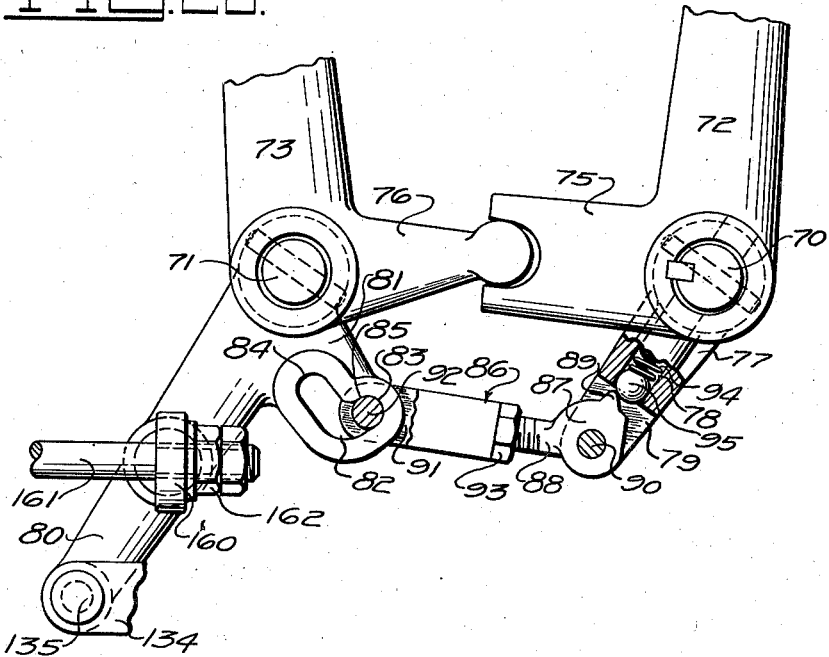
Figure 20 is a detail plan view partly in section and showing a step in the movement of the toggle employed in conjunction with the selector levers.

In carrying the invention into effect, I employ a casing 10 which, as seen in Figure 13, is provided at the left side thereof with a reduced extension 11 and in this connection, it may be noted that the arrows of the section line 13—13 of Figure 5 point toward the front end of the casing and the terms right and left as used herein will be predicated accordingly. Formed on the casing at its lower side is a bottom flange 12 which, as seen in Figure 1, is shaped to fit over a conventional transmission case, as conventionally shown at 13 (Figure 7), supplanting the usual transmission case cover and, as will be observed, the flange 12 is apertured to receive the usual bolts which ordinarily secure the transmission case cover so that, as will be appreciated, the casing 10 may be readily mounted in operative position. At its forward end the casing is, as seen in Figures 1 and 7 of the drawings, reduced in width and stepped to provide a shelf 14, and closing the casing at its upper side is a removable cover plate 15.

Inserted through the rear end wall of the casing is a pair of removable rods 16 and 17 which, as shown in Figure 11, are slotted at their rear ends and screwed to said end wall of the casing is a locking plate 18 provided at its ends with oppositely presented lugs engaging in the slots of the rods for locking the rods against rotation as well as against endwise movement. Formed in the lower side of the rod 16 medially thereof, as shown in dotted lines in Figures 1, 3 and 5 of the drawings, is a neutral notch 19, a low speed notch 20 and a reverse notch 21. The rod 17 is similarly provided with a neutral notch 22, a second speed notch 23 and a high speed notch 24.

Slidable on the rods 16 and 17 are gear shifters 25 and 26, the shifter 26 being individually shown in Figure 25 of the drawings. Near opposite ends thereof, these shifters, as seen in Figures 1 and 13 of the drawings, are provided with thickened bosses which form heads, the head of the shifter 25 being indicated at 27 and the head of the shifter 26 being indicated at 28, and formed on the shifters at their lower margins are parallel vertical flanges 29. It is now to be observed, as particularly seen in Figures 1, 5 and 13 of the drawings, that the side walls of the casing 10 are provided medially with inclined portions which form longitudinal abutments 30 each having angularly disposed inner faces and, as best brought out in Figure 13, the heads 27 and 28 of the shifters are cut away to provide seats fitting the angularly disposed faces of the abutments to rest flat thereagainst. The abutments will thus limit the shifters against rotative movement on the rods 16 and 17 and are of a length equal to the endwise travel of the shifters to coact with said rods for slidably supporting the shifters for endwise movement within the casing 10. Depending from the rear end of the shifter 25, as seen in Figure 12, is a fork 31 and depending from the forward end of the shifter 26 is a fork 32, these forks extending into the transmission case to operatively engage the proper sliding gears of the transmission and in this connection, it should be observed that the gear engaged by the fork 31 is movable forwardly by the shifter 25 for low speed and rearwardly by said shifter for reverse while the gear engaged by the fork 32 is movable rearwardly by the shifter 26 for second speed and forwardly by said shifter for high speed.

As shown in Figure 13, the head 27 of the shifter 25 is slotted at its lower side and pivoted in said slot is a rocker 33. Seated in a suitable socket in the head to coact with one end of the rocker is a spring 34 and coacting with the opposite end of the rocker is a detent 35 slidable through the head to yieldably coact with the rod 16 under the influence of the spring 34. Figure 13 of the drawings shows the shifter 25 in neutral position and the detent 35 is accordingly engaged in the notch 19 of the rod 16. When the shifter is moved forwardly for rendering low speed active, the detent will ride out of the notch 19 to engage in the notch 20 of said rod while, when the shifter is moved rearwardly for rendering reverse active, the detent will ride out of the notch 21. Thus, the detent will act on the shifter for yieldably locking low speed active or reverse active as well as yieldably locking the shifter in neutral position.

Secured to the instrument board of the vehicle adjacent the steering post, as seen in Figure 7, is a sleeve 36 which extends through the vehicle dash and is appropriately anchored adjacent its lower end to the engine housing. Slidable longitudinally in said sleeve as well as rotatable therein is a control rod 37 to the upper end of which is fixed a handle 38 and rotatably connected to the lower end of said rod is the shaft of a flexible cable 39, the construction being such that only endwise movement can be imparted to said shaft by the rod. Upstanding from the rear end of the shifter 25, as seen in Figure 1, is a lug 40 and screwed into said lug is a stub shaft 41 having a flat face 42. Screwed into the rear end wall of the casing 10 is a sleeve 43 which slidably accommodates the stub shaft 41 and, as will now be observed, the adjacent end of the sheath of the cable 39 is detachably connected to the outer end of said sleeve while the adjacent end of the flexible shaft of the cable is welded into a suitable socket in the outer end of the stub shaft 41. The control rod 37 is thus operatively connected with the shifter 25 while by applying a wrench to the flat face 42 of the stub shaft 41 and rotating said shaft, the parts may be readily connected or disconnected.

Formed in the sleeve 36, as particularly seen in Figures 9 and 10 of the drawings, is an h-slot, the slot being the shape of the small letter h and comprising a long side 44 and a short side 45 joined by a transverse connecting portion 46. Fixed to the control rod 37 for movement in said slot is a stop pin 47.

Normally, the shifter 25 stands in middle neutral position, as shown in Figure 1, in which position of said shifter, the pin 37 is disposed midway of the long side 44 of the h-slot in the sleeve 36 at the connecting portion 46 of said slot. The handle 38 may then be said to be in neutral position since, as will presently appear, the position of the pin 47 just indicated is neutral for all speeds. As will be seen, the handle 38 may, when the pin 47 is at the portion 46 of the slot, be rotated clockwise to the right to dispose the pin 47 in the long side 44 of the slot or counter-clockwise to the left to dispose the pin 47 in the short side 45 of the slot. For convenience of description, the right or long side 44 of the h-slot will be referred to as the manual side while the short or left side 45 of said slot will be referred to as the automatic side. For the same reason like terms will also be used in connection with the handle 38, the handle being turned to the manual side when rotated to the right and being turned to the automatic side when rotated to the left while, when the handle is turned to the manual side and is in middle position, the handle is, as just above noted, in neutral.

Assuming now that the shifter 25 stands in neutral position, it will be seen that when the handle 38 is turned to the manual side, said handle may be actuated for shifting the rod 37 downwardly and moving the gear shifter 25 forwardly for rendering low speed active, as previously described, while, when the handle is returned to its initial position, low speed will be neutralized. Conversely, by pulling on the handle, the rod 37 may be shifted upwardly for moving the gear shifter 26 rearwardly and rendering reverse active while, when the handle is returned to its initial position, reverse will be neutralized. I accordingly provide a means whereby low and reverse may be manually selected, manually rendered active and manually neutralized.

Removably secured in position by the locking plate 18, as particularly seen in Figure 1, is a rotatable selector shaft 48, journaled at its ends in suitable bearings. This shaft is disposed midway between the rods 16 and 17 parallel thereto and slidably fitting said shaft is a pair of companion selectors 49 and 50, shown in detail in Figure 22 of the drawings. As will be observed, the selector 49 includes a pair of sector-shaped fingers 51 integrally connected by an end ring or head at the outer end of the selector and screwed to said fingers or otherwise detachably connected thereto is a collar 52 cooperating with said end ring to provide an intervening annular groove 53 adjacent the outer end of the selector. Formed in each of the fingers 51 adjacent the collar 52 is a second speed socket 54. The selector 50 is substantially a counterpart of the selector 49 and includes a pair of sector-shaped fingers 55 which, as seen in Figure 13 of the drawings, digitate with the fingers 51 of the selector 49 about the shaft 48 so that the several fingers provide a cylindrical surface around the shaft and formed in one of the fingers 55 is a suitable keyway to receive a key 56 locking the selector 50 to turn with the shaft 48. Thus, as the fingers 55 inter-engage with the fingers 51 of the selector 49, both selectors are locked to turn with the shaft. The fingers 55 like the fingers 51 are integrally connected at their outer ends by an end ring or head and screwed or otherwise detachably connected to the fingers 55 is a collar 57 cooperating with said end ring to provide an annular groove 58 around the selector near the outer end thereof. Formed in each of the fingers 55 adjacent the collar 57 is a high speed socket 59.

As shown in Figure 13, the head 28 of the gear shifter 26 is slotted at its lower side and pivoted in said slot is a rocker 60 like the rocker 33. Formed through the lower portion of the head, as seen in detail in Figure 13, is a square opening and slidably fitting in said opening is a square plunger 61, the plunger being thus locked against rotation. Interposed between the lower end of the rocker 60 and said plunger is a spring 62 one end of which is accommodated in a suitable socket in the plunger and, as will be noted, the plunger is formed at its outer end with a reduced tip 63 of a thickness somewhat less than the width of the sockets 54 and 59 in the fingers of the selectors to provide corresponding play between these parts. As brought out in Figure 22, the end walls of the sockets 54 and 59 are flat to engage the flat faces of the tip 63 of the plunger while the bottom walls of said sockets are concave, the tip of the plunger being provided with a convex end face so as to seat flat against the bottom walls of the sockets. This construction provides an arrangement whereby, when the selectors are shifted, as will be presently described, the plunger 61 will, when engaged in any one of the sockets 54 and 59, serve to effectually couple the gear shifter 26 with either one or the other of said selectors, as the case may be while, when the selectors are rotated, the plunger will readily ride out of said sockets. Slidable through the head 28 to coact at one end with the upper end of the rocker 60 and at its opposite end with the rod 17 is a detent 64, the plunger 61 and the detent 64 being both actuated by the single spring 62.

When the selectors are shifted outwardly away from each other to normal retracted position, as seen in Figure 1, the fingers 51 and 55 of said selectors still provide a cylindrical surface against which the plunger 61 rests so that at no time will the plunger ride off of said fingers to become displaced by the spring 62. At the meeting longitudinal edges of the fingers, the outer corners thereof are cut away to provide concave neutral grooves 65 extending longitudinally of the fingers and of a length somewhat greater than the endwise travel of the selectors. These grooves are thus located 90° apart midway between the sockets 54 and 59 of the selector fingers and, as shown in Figure 14, are adapted to selectively receive the tip 63 of the plunger 61 when the selectors are rotated to neutral position, as will be presently described.

When the selectors 49 and 50 are shifted inwardly toward each other, as shown in Figure 3, it will be noted that the fingers 51 and 55 of said selectors do not project beyond the outer ends of the selectors. In thus forming the selectors with overlapping fingers, ample endwise travel of the selectors is possible while, at the same time, the structure is compact. Furthermore, it will be noted that when the selectors are shifted inwardly, the sockets 54 and 59 in the fingers of said selectors are brought into circular alignment to selectively receive the plunger 61 as the selectors are rotated while between said sockets are disposed the neutral grooves 65 to selectively receive the plunger as the selectors are turned to a point midway between each pair of adjacent sockets. It is thus possible to employ but a single plunger upon the gear shifter 26 to coact with both selectors for coupling the shifter either to the selector 49 for endwise movement therewith to render second speed active or to the selector 50 for endwise movement therewith to render high speed active, as will be later explained. Normally, the detent 64 will, as shown in Figure 14, be engaged in the notch 22 of the rod 17 for yieldably locking the shifter 26 in neutral position. When the shifter is moved rearwardly, the detent will ride out of the notch 22 and engage in the notch 23 for yieldably locking second speed active while, when the shifter is moved forwardly from neutral position, the detent will ride out of the notch 22 and engage in the notch 24, as shown in Figure 13, for yieldably locking high speed active.

Pivoted at its outer end to the rear end wall of the casing 10, as shown in Figure 7, is an interlock lever 66 detachably mounted by a cap screw 67 in a plane midway between the gear shifters 25 and 26. At its inner end this lever is, as shown in detail in Figure 19, provided with a T-head 68 and formed in the parallel vertical flanges 29 of the gear shifters 25 and 26 are sockets 69 which, when said shifters are centralized within the casing in neutral position, are disposed opposite each other in alignment with the T-head 68. The head is, as will be noted, of a length greater than the distance between said flanges so that when either gear shifter is moved from neutral position, the socket in the flange 29 thereof will coact with the adjacent end of the head for rocking the lever and engaging the other end of the head in the socket in the flange of the other gear shifter, when the head will be confined between said flanges. Accordingly, as will be seen, the construction provides a means for automatically locking either gear shifter in neutral position as the other shifter is moved so that by no possibility can both shifters be moved at the same time to render more than one speed active.

Journaled through a suitable bearing in the bottom wall of the extension 11 of the casing 10, as particularly shown in Figure 12, is a vertically disposed shaft 70 opposite which is similarly mounted a like shaft 71. Keyed to the upper end of the shaft 70 is a selector lever 72 and freely mounted upon the upper end of the shaft 71 is a coacting selector lever 73. The free ends of these levers extend over the selectors 49 and 50 and depending from said levers are studs 74 freely engaging in the annular grooves 53 and 58 of the selectors. Thus, when the levers are swung inwardly towards each other, the selectors will be moved inwardly to the position shown in Figure 3 while, when the levers are swung apart, the selectors will be shifted outwardly to normal position as shown in Figures 1 and 5. Extending laterally from the hub of the lever 72 is an arm 75 notched at its free end and extending laterally from the hub of the lever 73 is an arm 76 rounded at its free end to engage in said notch so that the levers are thus coupled to swing in unison.

Pinned to the lower end of the shaft 70 is a toggle lever 77 having a bore 78 therein which extends through the hub of said lever while at its free end the lever is provided with a yoke 79. Pinned to the lower end of the shaft 71 is an operating lever 80 from the inner end of which extends a short integral toggle lever 81 in which is formed a substantially L-shaped slot 82 having a short leg 83 and a long leg 84. The short leg provides a shoulder 85 but, as will be observed, the outer wall of the slot is curved at the junction between the legs. Connecting the levers 77 and 81 is a link indicated for convenience as a whole at 86. This link is formed of complemental sections one of which is provided with a cam head 87 from which extends a shank 88 and rising from said head is a cam peak or lug 89. The head 87 is freely accommodated between the sides of the yoke 79 of the lever 77 and pivotally connecting the head with said yoke is a pin 90. The other section of the link comprises a yoke 91 which straddles the lever 81 and connecting said yoke with said lever is a pin 92 which is freely accommodated through the slot 82. The yoke 91 is screwed on the shank 88 for adjustment thereon and locking the yoke in adjusted position is a jam nut 93. Inserted in the bore 78 of the lever 77 is a spring 94 abutting the shaft 70 and freely movable in the bore is a ball detent 95 urged by said spring to coact with the cam head 87 of the link.

As previously noted, the free ends of the levers 72 and 73 normally stand apart, as shown in Figure 1, and this figure of the drawings also shows the normal set position of the toggle. In this position of the parts, the pin 92 of the link 86 is seated in the short leg 83 of the slot 82 to coact with the shoulder 85 while the ball detent 95 is disposed forwardly of the cam peak 89 to coact with the cam head 87 for maintaining the pin 92 seated as well as holding the link firm and it will now be assumed that the lever 80 is swung forwardly. As will be perceived, the lever 81 will thus be initially caused to travel in an arc toward the pin 90 with the result that the shoulder 85 will be caused to coact with the pin 92 for pushing on the link 86 with the result that the lever 77 will be swung away from the shaft 71. Accordingly, the free end of the lever 72 will be swung inwardly and as the levers 72 and 73 are coupled to swing in unison, the free ends of both levers will be swung inwardly, as shown in Figurs 3, for shifting the selectors 49 and 50 inwardly to the end of their throw.

During this first portion of the travel of the lever 80, the lever 77 and link 86 function as a toggle and as the pin 92 is, in the meantime, traveling in an arc with the lever 81, the link 86 is coincidently rocked on the pin 90. Accordingly, the cam head 87 is pivoted relative to the ball detent 95 until the forward face of the cam peak 89 is brought into engagement with said detent. The detent will thus coact with said face of the cam peak for urging the link 86 clockwise and resisting any tendency of the pin 92, due to the pushing thrust thereon, to ride out of engagement with the shoulder 85. As the pin 92 travels into line with the shaft 71 and pin 90, this tendency of the ball detent to swing the link clockwise is progressively increased as the ball detent rides up the forward face of the cam peak to compress the spring 94 so that, as shown in Figure 3, when the free ends of the levers 72 and 73 reach the end of their inward throw and the selectors 49 and 50 are accordingly shifted inwardly to the limit of their movement, the ball detent 95 will, when the toggle reaches dead center, coact with the forward face of the cam peak near the tip of said peak for firmly maintaining the link in position to receive the pushing thrust thereon to the extreme end of its pushed travel.

As the forward swinging movement of the lever 80 then continues, the pin 92 will be swung dead center by the lever 81 while the ball detent 95 will remain engaged with the forward face of the cam peak 89 adjacent the tip thereof to still urge the link 86 clockwise and maintain the pin 92 seated in the short leg 83 of the slot 82. As soon as the pin 92 crosses dead center, the short leg of the slot will begin to move away from the pin 90 but the clockwise thrust of the ball detent 95 on the link 86 will continue until, as the lever 81 is swung forwardly by the lever 80 to pull on the link, the link is rocked on the pin 90 by the lever 81 to ride the cam peak 89 across said detent and break the toggle. The ball detent will then coact with the rear face of the link, as shown in Figure 20, to exert a counter-clockwise thrust on the link which thrust, however, will be overcome by the pull of the lever 81 on the link. Thus, as the lever 80 continues forwardly in its swinging movement to the end of the throw thereof, the lever 81 will pull on the link 86 for swinging the lever 77 toward the shaft 71 and swinging the free ends of the levers 72 and 73 outwardly to the end of their throw, as shown in Figure 5, to shift the selectors 49 and 50 outwardly to normal position.

Figure 21:
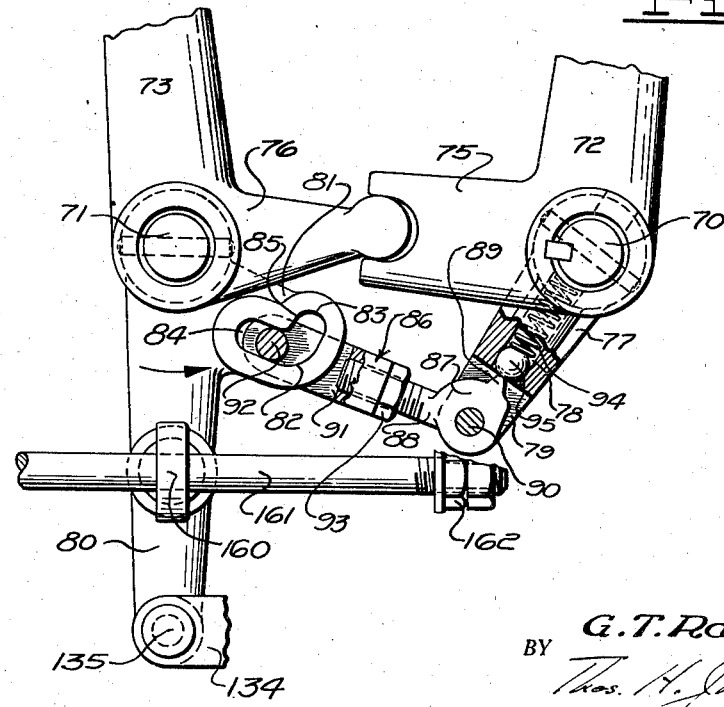
Figure 21 is a view similar to Figure 20 and showing another step in the movement of the toggle.

Figures 5 and 20 of the drawings show the operating lever 80 at the end of its forward throw and it will now be assumed that said lever is returned rearwardly. Immediately as the lever 80 starts to travel rearwardly and the lever 81 thus begins to swing therewith, the short leg 83 of the slot 82 will begin to travel in an arc away from the pin 92 while said pin will, due to the counter-clockwise thrust exerted on the link 86 by the ball detent 95, as previously noted, be urged in a direction out of said leg of the slot to follow the outer curved wall of the slot. Accordingly, as the rearward movement of the lever 80 continues, the pin 92 will, as shown in Figure 21, be caused to ride out of the short leg 83 of the slot into the long leg 84 thereof, the lever 77 remaining stationary. Thus, during the first portion of the rearward travel of the lever 80 when the lever 81 is swung toward the pin 90, such travel of the lever 81 is accommodated by the long leg 84 of the slot, in which leg the pin 92 freely rides.

As the rearward travel of the lever 80 continues, the lever 81 will, of course, act on the pin 92 for rocking the link 86 on the pin 90 so that the pin 92 will be returned across dead center while the cam peak 89 will be returned across the ball detent 95 to again act against the forward face of said cam peak to exert a clockwise thrust on the link. Accordingly, as the lever 80 approaches the end of its rearward throw and the short leg 83 of the slot 82 again becomes accessible to the pin 92, said pin will be snapped, by the ball detent acting on the link, into said leg of the slot for resetting the toggle ready to function when the operating lever 80 is next swung forwardly.

Attention is now particularly directed to the fact that the one-way forward movement of the operating lever 80 is converted by the toggle into a two-way movement of the levers 72 and 73 for first shifting the selectors 49 and 50 inwardly and then returning the selectors outwardly to normal position while upon the return throw of the operating lever, the toggle is automatically reset without moving the selector levers or disturbing the selectors. Furthermore, it is to be noted that the force required to swing the levers 72 and 73 for shifting the selectors is transmitted directly through the toggle not only to swing the levers toward each other but also to swing said levers apart.

Referring again to Figures 1 and 3 of the drawings, it will be seen that the rate of travel imparted to the levers 72 and 73 by the toggle will be greatest at the inception of the movement of said levers toward each other and will gradually diminish as the toggle approaches dead center so that a corresponding diminishing rate of shifting movement will be imparted to any gear being neutralized by the selectors 49 and 50. The manner in which the gears are neutralized will be presently explained. Conversely, the rate of travel imparted by the toggle to the levers 72 and 73 will, as will be appreciated upon reference to Figures 3 and 20 of the drawings, be least at the inception of movement of said levers apart and will gradually increase as the pin 92 approaches the forward end of its arc of travel so that a corresponding increasing rate of shifting movement will be imported to any gear being rendered active by either of the selectors 49 and 50. The manner in which the gears are so rendered active will be presently explained. Furthermore, after the levers 72 and 73 reach the end of their inward throw and any gear is thus neutralized by the inward movement of the selectors, said levers and the selectors will be permitted to pause momentarily as the toggle crosses dead center. Thus, after any gear is neutralized, the usual gear synchronizing mechanism will be permitted to function during said pause before the levers are again swung apart and the selectors shifted outwardly for positive engagement of a selected gear. As will be appreciated, by adjusting the yoke 91 on the shank 88 of the toggle link 86 the effective length of said link may be varied for varying the throw of the levers 72 and 73 to suit the axial gear travel of different transmissions as well as to compensate for wear.

Journaled through a suitable bearing in the shelf 14 adjacent the forward end of the shaft 48, as seen in Figure 7, is a vertically disposed shaft 96 to the lower end of which is fixed a lever 97 and depending from said shelf are spaced pins 98 and 99 for limiting the lever in its swinging movement. Freely mounted on the upper end portion of the shaft 96 is a bevel gear 100. At its forward end, the shaft 48 is reduced and fixed to the reduced portion thereof to mesh with the bevel gear 100 is a bevel gear 101, said gears being of a 2 to 1 ratio. Upstanding from the gear 100 are four long ratchet pins 102 equi-distantly spaced circumferentially of the gear and upstanding from said gear at points midway between the long pins 102 are four short ratchet pins 103. The relative length of these pins is best shown in Figures 7 and 16 and, of course, the several pins are disposed 45° apart. It is now to be observed that the lever 73 is somewhat longer than the lever 72 and pivoted to the forward end of the lever 73 at its lower side is a pawl 104 detachably mounted, as particularly seen in Figure 13, upon a screw stud 105. Coiled around the head of said stud is a spring 106 one end of which is anchored to a suitable lug upon the inner edge of the lever 73 while the opposite end of the spring engages over the outer edge of the pawl 104. As best seen in Figure 16 of the drawings, the pawl extends over the gear 100 to rest thereon and, as will be appreciated, the spring 106 will urge the free end of the pawl to coact with the ratchet pins 102 and 103.

Mounted on the sleeve 36, as shown in Figure 7, is a lever 107 having a hub 108 surrounding said sleeve and formed in the upper side of the sleeve beneath the hub, as shown in Figure 8, is a transverse slot 109. Formed in the lower end portion of the control rod 37 at its upper side is a longitudinally extending groove 110 and extending through the hub 108 of the lever 107 is a stop screw 111 which projects through the slot 109 in the sleeve 36 and at its inner end is provided with a smooth stud 112 which is freely received in the groove 110 of the rod 37, the stop screw being secured in position by a suitable jam nut. Thus, when the control handle 38 is turned to rotate the rod 37, the lever 107 will be swung by the stop screw 111 which will travel in the slot 109 while, however, when the handle 38 is operated to shift the rod 37 endwise to control low and reverse as previously described, the stop screw 111 will coact with the walls of the slot 109 for limiting the lever 107 against lateral movement with the rod. Extending between the lower end of the lever 107 and the free end of the lever 97 is a rod 113 which, as seen in Figure 8, is detachably connected with said levers.

Fixed to the upper end of the shaft 96 is a lever 114 and pivoted to the free end of the lever at its lower side, as shown in Figure 16, is a pair of superposed pawls comprising a long pulling pawl 115 and a short pushing pawl 116, the relative length of these pawls being seen in Figure 3. Urging the pawl 115 to coact with the ratchet pins 102 and 103 is a spring 117 and removably fixed at one end in a suitable recess in the adjacent wall of the casing 10 to coact with said pawl is a deflector finger 118 extending at its free end into the path of travel of the pawl. Urging the pawl 116 to coact with the ratchet pins 102 and 103 is a spring 119 and, in this connection, it may be observed that said pawl rides at all times against said pins.

In the neutral position of the handle 38, the lever 97 stands engaged with the stop pin 98 so that the lever 114 is swung to the position shown in Figure 1 when the pivoted ends of the pawls 115 and 116 serve to hold the pawl 104 away from the ratchet pins 102 and 103 in inactive position. Furthermore, when the mechanism is in neutral, as shown in Figure 1, the selectors 49 and 50 stand retracted while the gear shifters 25 and 26 stand centralized within the casing. It is also to be particularly noted that when the mechanism is in neutral, the tip 63 of the plunger 61 stands engaged, as shown in Figure 14, in one of the neutral grooves 65 of the selectors. Assuming therefore that the operating lever 80 is swung forwardly, as previously described, the pawl 104 will not function as the levers 72 and 73 are swung while the plunger tip will, as the selectors 49 and 50 are shifted, ride in said neutral groove. Thus, the neutral setting of the mechanism will remain unaffected.

Assuming now that the handle 38 is turned to the automatic side, it will be seen that the lever 97 will be swung to engage the stop pin 99 so that the lever 114 will be swung to the position shown in Figure 5, away from the pawl 104 to ride the pawl 115, as shown in Figure 17, onto the finger 118. The pawl 115 will thus be held inactive by said finger while the pawl 104 will move to active position to coact with the ratchet pins 102 and 103 and, in this connection, it may be noted that as the plunger 61 yieldably bears against the selectors 49 and 50 at all times, said plunger will consequently hold the selectors and therefore the shaft 48, against any free rotative movement with the result that the loose gear 100 will be locked by the gear 101 against any free rotation.

Clockwise rotation of the gear 100 by the pawl 104 will, of course, turn the shaft 48 in a counter-clockwise direction and as the pins 102 and 103 are 45° apart, the active throw of the pawl will turn said gear 45° and consequently turn the shaft 90° to correspondingly rotate the selectors 49 and 50. Thus, as the sockets 54 and 59 in the selector fingers are spaced 90° apart, the selectors will be rotated step by step by the pawl 104 to receive the plunger tip 63 in said sockets successively.

As will be presently explained, the selectors 49 and 50 are, when the handle 38 is turned to neutral, always rotatably set to receive the tip 63 of the plunger 61 in one of the neutral grooves 65 and as these grooves are disposed midway between the sockets 54 and 59 in the fingers of the selectors 49 and 50, the plunger will rest either in a neutral groove 45° ahead of the high speed socket 59 of one finger of the selector 50 or in a neutral groove 135° ahead of the high speed socket of the other finger of said selector.

It is now to be noted that as the short pawl 116 is disposed on top of the pawl 115, only the long pins 102 of the gear 100 are, as brought out in Figure 16, of sufficient height to be engaged by the short pawl and when the mechanism is in neutral, the short pawl will, as shown in Figure 1, be retracted by the lever 114 to the end of its throw ready to engage any long pin 102 disposed in the path of its active movement. As will be perceived, the plunger 61 is, in the position of the parts shown in Figure 1, engaged in the neutral groove 65 which is disposed 45° in advance of the high speed socket 59 of one of the fingers of the selector 50 and attention is directed to the fact that only one of the long pins 102 of the gear 100 is disposed in the path of the active throw of the pawl 116 which pin, in the position of the parts indicated, lies 22½° from the end of said throw. Accordingly, when the handle 38 is turned to the automatic side and the lever 114 is swung, as previously described, the pawl 116 will engage the long pin 102 indicated and rotate the gear 100 clockwise 22½° with the result that the shaft 48 will be turned counter-clockwise 45° and the selectors correspondingly rotated to dispose the high speed socket of the selector finger indicated in line with the plunger 63. Thus, when the operating lever 80 is swung forwardly, as previously described, and the levers 72 and 73 are swung inwardly, the pawl 104 will engage one of the ratchet pins 102 and 103 and rotate the selectors 90°, as previously described, to dispose the second speed socket 54 of the next succeeding finger of the selector 49 in position to receive the tip 63 of the plunger 61 as the selectors reach the end of their inward movement. The plunger tip will then, of course, engage in said socket of the selector 49 for coupling the shifter 26 to said selector so that, as the levers 72 and 73 are swung apart and the selectors are returned to the end of their outward movement, the shifter 26 will be moved rearwardly to render second speed active.

Assuming now that when the mechanism is in neutral, the plunger 61 is engaged in the neutral groove 65 of the selectors which is disposed 135° in advance of the high speed socket 59 of the next succeeding finger of the selector 50. In this position of the parts, one of the long pins 102 of the gear 100 will be disposed in the path of the active throw of the pawl 116, 67½° from the end of said throw and as in the instance previously described, only a single long pin will lie in said path. In this connection, it may be noted that the long pins 102 are, of course, properly positioned circumferentially of the gear 100 in relation to the position of the fingers of the selector 50 and as the selectors and the gear will always turn in unison, the relation between the pins and said selector fingers will not change. Furthermore, it is to be noted that the 2 to 1 ratio between the gear 100 and shaft 48 will compensate for the difference between the number of long pins on the gear and the number of fingers on the selector 50 so that while but a single long pin will, at any one time, be disposed in the path of the active throw of the pawl 116, some one of said pins will, when the plunger is engaged in the neutral groove 65, 45° in advance of the next succeeding high speed socket, always reach a point 22½° from the end of the active throw of the pawl 116 while, when the plunger is engaged in the neutral groove 135° in advance of the next succeeding high speed socket, some one of the long pins will always be moved to a position 67½° from the end of the active throw of the pawl 116. Continuing, therefore, with the instance last taken, it will be seen that when the plunger 63 is engaged in the neutral groove 135° in advance of the next succeeding high speed socket of the selector 50 and the handle 38 is turned to the automatic side, the pawl 116 will engage the long pin 102 disposed in the path thereof for rotating the gear 100, 67½° and turning the shaft 48, 135° for correspondingly rotating the selectors to dispose said high speed socket of the selector 50 in line with the plunger. Accordingly, when the operating lever 80 is then swung forwardly, the pawl 104 will rotate the gear 100, 45° for turning the selectors 90°, as previously described, so that as the selectors reach the end of their inward movement, the second speed socket 54 in the next succeeding finger of the selector 49 will be disposed to receive the plunger 61. The tip 63 of the plunger will then, of course, engage in said socket for coupling the shifter 26 with the selector 49 so that as the levers 72 and 73 are swung outwardly to the end of their throw, the shifter 26 will be moved rearwardly for rendering second speed active.

As will thus be seen in view of the foregoing description, I provide means operable by the handle 38 such that when said handle is turned to the automatic side, the selectors 49 and 50 will be rotatably set in such a position that, upon the ensuing operation of the mechanism, second speed will always be initially selected automatically and rendered active. Assuming therefore, that the handle 38 is pushed forwardly on the manual side for rendering low speed active and is then returned for neutralizing low speed, as previously described, when the handle is turned to the automatic side, it will be seen that second speed will always be automatically selected and rendered active following low speed.

When the handle 38 is pushed forwardly on the manual side, the operator will, of course, be able to feel the detent 35 drop into the low speed notch 20 while, when the handle is pulled rearwardly to neutralize said speed, the operator will be able to feel said detent drop into the notch 19. Similarly, when the handle is pulled rearwardly from neutral position for rendering reverse active, the operator will be able to feel the detent 35 drop into the reverse notch 21. The operator will thus be able to tell when low speed has been rendered active, when reverse has been rendered active or when either low speed or reverse has been neutralized so that the handle 38 may be shifted without any attending uncertainty on the part of the operator as to the effect produced by the movement of said handle and, of course, this will also be true when the handle is manually shifted forwardly on the automatic side, as will be later explained, for manually rendering low speed active. It is to be particularly noted, however, that the handle 38 cannot be turned to the automatic side until the handle has been operated to neutralize the low or reverse gear of the transmission if either is active and the pin 47 is brought to middle neutral position so that when the handle is turned, said pin may cross through the connecting portion 46 of the h-slot.

Assuming now that second speed has been automatically selected and rendered active, as previously described, it will be seen that when the operating lever 80 is next swung forwardly, the selectors 49 and 50 will be rotated by the pawl 104 as the levers 72 and 73 are swung inwardly but as long as the plunger 61 remains engaged in the registering second speed socket of the selector 49, the shifter 26 will be returned toward neutral position by the plunger. It is to be noted, however, that the collars 52 and 57 of the selectors are disposed to engage the selector heads 27 and 28 so that as the levers 72 and 73 swing inwardly, the collar 52 of the selector 49 will engage the head 28 of the shifter 26 for returning said shifter to neutral position as shown in Figure 3, and consequently neutralizing second speed. Coincidentally, the selectors will be rotated 90° by the pawl 104 so that as the selectors reach the end of their inward movement, the high speed socket 59 of one of the fingers of the selector 50 will be disposed to receive the plunger 61. The plunger will then, of course, drop into said socket for coupling the shifter 26 with the selector 50 so that as the forward movement of the operating lever 80 continues and the levers 72 and 73 are swung apart, the shifter 26 will, as shown in Figure 5, be carried forwardly with the selector 50 to render high speed active.

It will now be assumed that high speed is active and that the operating lever 80 is again swung forwardly. As will be appreciated, the plunger 61 will, as long as said plunger remains engaged in the registering high speed socket of the selector 50, return the shifter 26 toward neutral position but as the collar 57 of said selector is disposed to engage the shifter head 28, the collar will coact with said head for returning the shifter 26 to neutral position and neutralizing high speed. Coincidentally, the selectors 49 and 50 will be rotated 90° by the pawl 104 so that as the selectors reach the end of their inward movement, the second speed socket 54 in one of the fingers of the selector 49 will be moved into position to receive the plunger 61. The plunger will then, of course, drop into said socket for coupling the shifter 26 with the selector 49 so that as the forward movement of the operating lever 80 continues and the levers 72 and 73 are swung apart, the shifter 26 will be carried rearwardly by the selector 49 for again rendering second speed active.

It will thus be seen that as long as the handle 38 remains on the automatic side, the mechanism will function, upon the initial actuation thereof, to automatically select and render active second speed, that upon the next actuation of the mechanism, second speed will be automatically neutralized and high speed automatically selected and rendered active, that upon the next actuation of the mechanism, high speed will be neutralized and second speed again automatically selected and rendered active, and so on indefinitely.

It will now be assumed that either second speed or high speed is active and that the handle 38 is turned to the manual side in neutral position. As will be seen, the lever 114 will be swung from the position shown in Figure 3 back to the position shown in Figure 1 for rendering the pawl 104 inactive while the lever 97 will be swung to again engage the stop pin 98 and in this connection, attention is directed to Figures 17 and 18 of the drawings. When the handle 38 is on the automatic side, the pawl 115 stands, as previously noted, on the finger 118, as shown in Figure 17, in inactive position but as the handle is turned to neutral, as just assumed, the pawl will ride off of said finger and, as shown in Figure 18, engage the first of any one of the pins 102 and 103 disposed in the path of the active throw of the pawl so that as the lever 114 is returned to the end of its throw, as shown in Figure 1, the gear 100 will be rotated counter-clockwise. Due to the length of the finger 118, the working throw of the pawl 115 is 22½° and as there are eight pins but only four neutral grooves 65, the number of pins will compensate for the 2 to 1 ratio between the gear 100 and gear 101 so that regardless of whether second speed is active or high speed is active, some one of the pins 102 and 103 will always be disposed in the path of the working throw of the pawl 115, 22½° from the end of said throw. Accordingly, when the handle 38 is turned from the automatic side to neutral position and the lever 114 is swung, the pawl 115 will turn the gear 100 counter-clockwise 22½° with the result that the selectors 49 and 50 will be rotated clockwise 45°. Thus, if at the time, the plunger 61 is engaged in one of the sockets 54 of the selector 49, the tip 63 of the plunger will be caused to ride out of said socket, as the selectors are rotated to engage in the neutral groove 65, 135° in advance of the next succeeding high speed socket 59 of the selector 50 while, if at the time, the plunger 61 is engaged in one of the high speed sockets 59 of the selector 50, the tip 63 of the plunger will, as the selectors are turned, be caused to ride out of said socket to engage in the neutral groove 65, 45° in advance of the next succeeding high speed socket 59. It will accordingly be seen that when the mechanism is neutralized, the plunger 61 will rest either in the neutral groove 65, 135° in advance of the next succeeding high speed socket or in the neutral groove 45° in advance of the next succeeding high speed socket, as previously indicated.

Continuing, therefore, with the assumption that when either second speed or high speed is active, the handle 38 is turned from the automatic side to neutral position, it will be seen that the selectors 49 and 50 will be rotated to engage the plunger 61 in one of the neutral grooves 65 of the selector fingers so that when the operating lever 80 is next swung forwardly and the selectors 49 and 50 are moved inwardly, the collar 52 of the selector 49 will, if second speed is active, engage the head 28 of the shifter 26 for returning said shifter to neutral position and neutralizing second speed while, if high speed is active, the collar 57 of the selector 50 will engage said head for returning the shifter 26 to neutral position and neutralizing high speed, the plunger 61 meantime riding inactive in said neutral groove. Accordingly, either second speed or high speed will, if active, as the case may be, be automatically neutralized.

Assuming that low speed is active, it will be seen that when the lever 80 is swung forwardly, the collar 57 of the selector 50 will engage the head 27 of the shifter 25 for returning said shifter to neutral position and neutralizing low speed. Similarly, when reverse is active and the operating lever 80 is swung forwardly, the collar 52 of the selector 49 will engage the head 27 of the shifter 25 for returning said shifter to neutral position and neutralizing reverse. Thus, as will be perceived, not only second and high will be automatically neutralized by the mechanism, as previously described, but also, low and reverse may, instead of being manually neutralized, as previously described, be automatically neutralized if so preferred. In any event, however, if the handle 38, after having been pushed forwardly for rendering low speed active, is allowed to remain in its forward position, low speed will be neutralized upon the actuation of the operating lever 80. Similarly, if the handle 38 is allowed to remain in its rear position after having been manually operated for rendering reverse active, reverse will be automatically neutralized upon the next actuation of the operating lever 80.

As previously explained, the handle 38 may, while either second or high speed is active, be turned to neutral position for preselecting neutral for subsequent automatic neutralization of the mechanism and attention is now directed to the fact that, after the handle 38 has been turned to the automatic side, the stop pin 47 may travel forwardly in the short side 45 of the h-slot so that said handle may be pushed forwardly when on the automatic side for manually selecting and rendering active low speed prior to the automatic selection and rendering active of second speed, as previously described. Thus, after the handle 38 has been pushed forwardly on the automatic side, no further attention need be given thereto as, when the operating lever 80 is next actuated, low speed will, as previously described, be automatically neutralized so that the handle 38 will be returned to middle position on the automatic side, after which second speed will be automatically selected and rendered active, followed by high speed in the manner previously explained. As long as it is desired to have the mechanism function automatically, the handle will be permitted to remain in middle position on the automatic side. It will be noted, however, that the mechanism may be easily and quickly neutralized at any time simply by turning the handle to the manual side in neutral position.

Attention is now directed to Figures 14 and 15 of the drawings. As will be noted, the neutral grooves 65 of the selector fingers are more shallow than the high and second speed sockets 54 and 59 of said fingers. Accordingly, when the plunger 61 is engaged in any one of the neutral grooves 65, as shown in Figure 14, the spring 62 is correspondingly compressed and the pressure of said spring on the detent 64 is correspondingly increased for holding the shifter 26 against movement. Conversely, when the plunger 61 is engaged in any one of the sockets 54 and 59, as shown in Figure 15, the pressure of the spring 62 on the detent 64 is correspondingly relieved to facilitate the movement of said shifter for rendering a speed active or inactive. Thus, when the selectors 49 and 50 are rotated to cause the plunger tip 63 to drop into one of the sockets 49 and 50 as shown in Figure 15, the spring tension on the detent 64 will be relieved so that said detent may readily ride out of the neutral notch 22 in the rod 17 while, however, the spring tension on the plunger 61 will be entirely sufficient to hold the plunger tip engaged in said socket so that the plunger will effectually couple the gear shifter with either of the selectors for movement thereby. Assuming, however, that when either second speed or high speed is active, the handle 38 is turned to neutral, the selectors will, as previously explained, be rotated to engage the plunger 61 in one of the neutral grooves 65, as shown in Figure 14. The gear shifter 26 will thus be uncoupled from the selector with which it was engaged but, as previously noted, the spring tension on the detent 64 will be increased so that if the shifter is in its rear position, said detent will be urged by the increased pressure of the spring to firmly engage in the notch 23 of the rod 17 for yieldably locking second speed active while, if the shifter is in its forward position, said detent will be urged by the increased pressure of the spring to engage in the notch 24 of said rod for yieldably locking high speed active. When the handle 38 is turned to neutral and the selectors are rotatably set to engage the plunger 61 in one of the neutral grooves 65 of the selector fingers, the operator will of course be able to feel the plunger drop into said groove as the handle reaches the end of its turning throw so that no uncertainty will exist as to whether or not the object sought has been accomplished.

Fixed to any appropriate part of the vehicle adjacent the transmission is an arm 120 and pivoted to the free end of said arm, as particularly seen in Figure 1, is a power cylinder 121 which is preferably provided with removable heads 122. Projecting from the forward head of the cylinder are ears 123 which receive clamping rods 124 and formed on said rods are hooks 125 engaging over the rear cylinder head, the rods being equipped at their forward ends with nuts adjustable for clamping the cylinder heads in position on the cylinder shell. Screwed through the rear head of the cylinder axially thereof is an eye-bolt 126 and extending through the eye of said bolt and through the arm 120 is a bolt 127 pivotally connecting the cylinder with said arm.

Reciprocable in the cylinder is a piston including a piston rod 128 slidable through the front head of the cylinder and removably mounted on said rod is a piston head, indicated for convenience as a whole at 129. Adjacent its rear end, the piston rod is provided with a stop shoulder 130 and screwed on the rear end of the rod is a nut 131. Interposed between said shoulder and the nut is a pair of circular resilient clamping plates 132 and clamped between said plates are leathers 133. As will be observed, the plates 132 are provided, in spaced relation to the periphery thereof, with annular oppositely bowed portions while the peripheral margins of said plates are flared oppositely to coact with the leathers so that when the nut 131 is adjusted, the major portion of the clamping pressure of said plates will be exerted at the flared peripheral margins thereof on the peripheral margins on the leathers for effectually supporting the leathers to coact with the wall of the cylinder. At its forward end, the piston rod 128 is provided with a yoke 134 which is pivotally connected to the free end of the operating lever 80 by a removable pin 135 and adjustable on the forward end portion of the piston rod is a nut 136 between which and the yoke is clamped one end of a flexible boot 137, the opposite end of which is secured to the front cylinder head about the piston rod bearing therein for protecting said bearing as well as enclosing the forward end portion of the piston rod. Interposed between the front cylinder head and the piston head 129 is a volute spring 138 urging the piston rearwardly within the cylinder 121 and, as will now be observed, the piston rod 128 will engage the eye-bolt 126 for limiting the piston in its rearward movement. Accordingly, the eye-bolt 126 may be adjusted on the rear cylinder head for varying the throw of the piston to suit the throw of the operating lever 80 with relation to the position of the arm 120 and, of course, the cylinder will rock on said arm as the lever 80 is swung.

At its forward corner, the extension 11 of the casing 10 is formed with a flat seat 139 and detachably bolted to said seat is, as particularly seen in Figures 4, 5 and 6 of the drawings, a cylindrical vertically disposed valve casing 140 open at its lower end and provided at its upper end with a port 141 communicating with the atmosphere. Formed on the upper end portion of the valve casing at its forward side is a nipple 142 to which is connected a suction pipe 143 in communication with the intake manifold of the vehicle engine so that engine suction will be communicated through said pipe to the valve casing. Formed in the valve casing below the nipple 142 and in angular relation thereto, as particularly seen in Figures 1 and 2 of the drawings, is a compound nipple 144 and extending between said nipple and the front and rear ends respectively of the cylinder 121 are upper and lower pipes 145 and 146, which are flexible.

Slidable in the valve casing 140 is a tubular valve rod 147 shown in detail in Figure 24 of the drawings. The rod is, as particularly shown in Figure 6, closed at its upper end and rising therefrom, as seen in Figure 5, are spaced stop lugs 148 to engage the upper end wall of the casing for limiting the rod in its upward movement. Bisecting the lower end portion of the rod is a longitudinally extending slot 149 and extending transversely between the lower ends of the prongs thus formed is a stud 150. Slidable freely within the valve rod is a pin 151 and interposed between the upper end of said pin and the end wall of the rod is a spring 152 urging the pin downwardly. Formed in the exterior of the valve rod, as seen in Figure 24, is a longitudinally extending upper slot 153 opening onto the upper end of the rod between the stop lugs 148 and formed in the rod adjacent said slot is an L-slot having a narrow portion 154 extending parallel to the slot 153 at one side thereof and a wide portion 155 extending circumferentially of the rod beneath the lower end of the slot 153. Formed in the rod below the portion 155 of the L-slot is a lower slot 156 aligning with the slot 153. As will be observed, the portion 154 of the L-slot is disposed for registration with the port of the suction pipe 143 while the portion 155 of said slot is adapted to register with the spaced upper and lower ports of the pipes 145 and 146 as are also the slots 153 and 156.

The usual clutch pedal shaft of the vehicle is indicated at 157 and fixed thereon is the usual clutch pedal 157' and a bell crank embodying a lever 158 which extends upwardly and a lever 159 which extends rearwardly at a right angle to the former lever. As seen in Figures 4 and 13, the lever 159 extends at its rear end freely through the slot 149 in the valve rod 147 above the stud 150 to coact with the lower end of the sliding valve pin 151 so that, as will be seen, the valve rod thus floats in the casing 140 on the spring 152 but is locked against rotation by the lever 159. Swiveled on the operating lever 80 is an eye-bolt 160 and pivotally connected to the upper end of the lever 158 is a rod 161 which is slidably received through the eye of said bolt and is provided at its rear end with a stop nut 162 adjustable thereon for varying the effective length of the rod, a jam-nut also being preferably employed.

When the clutch pedal 157' of the vehicle stands retracted in normal position, the control valve and associated parts also stand in normal position, as shown in Figures 1 and 2 of the drawings. As will be observed, the valve rod 147 is at the bottom of its throw so that the narrow portion 154 of the L-slot lies below the port of the suction pipe 143, the rod thereby closing said port, while the wide portion 155 of said slot lies below the port of the pipe 146. Both of the latter ports are, however, in communication with the slot 153 in the valve rod so that air is thus admitted through the port 141, through said slot and through the pipes 145 and 146 to both ends of the cylinder 121. The piston 129 will thus rest at the rear end of its throw under the tension of the spring 138. It is also pointed out that, in the normal position of the clutch pedal, the stop nut 162 on the rod 161 stands away from the eye-bolt 160 a distance sufficient to permit the clutch pedal to be rocked forwardly to disengage the clutch without actuating the lever 80, approximately the first third of the forward throw of the rod 161 being idle. In this connection it may be noted that the first third of the forward throw of the clutch pedal is utilized to disengage the clutch while the second third of said throw is utilized to cause the shifting of the transmission gears. The last third of the forward throw of the clutch pedal is not utilized but provision is made whereby the pedal may freely continue to rock forwardly to the end of its throw.

It will now be assumed that the clutch pedal 157' is rocked forwardly for the first third of its throw to disengage the vehicle clutch. As will be seen, the operating lever 80 will remain at rest, as previously described. The lever 159 will, however, be caused to coact with the valve pin 151 for lifting the valve rod 147 approximately half of its upward throw to middle neutral position. As a result, the slot 153 will first be moved out of communication with the port of the pipe 146 for cutting off the admission of air to the rear end of the cylinder 121 when the wide portion 155 of the L-slot will be brought into communication with the port of said pipe. Engine suction will then be communicated through the pipe 143, the L-slot and through the pipe 146 to the rear end of the cylinder 121 but as, at the time, the piston 129 will, as previously noted, be at rest at the rear end of its throw, no movement will be imparted to the piston. As the valve rod 147 continues upwardly, the wide portion 155 of the L-slot will move out of register with the port of the pipe 146 and when the clutch pedal reaches the end of the first third of its forward throw and the vehicle clutch is disengaged, will be disposed at a level between the ports of the pipes 145 and 146. Consequently, when the valve rod is in middle neutral position, as just described, engine suction through the pipe 143 will be cut off. The slot 153 in the valve rod will, however, remain in communication with the port of the pipe 145 for admitting air to the front end of the cylinder, as previously described, while the slot 156 in the valve rod will be moved into communication with the port of the pipe 146 so that air will thus flow through the slot 156 and through the pipe 146 for relieving the partial vacuum behind the piston 129. Thus, as will be seen, the clutch pedal of the vehicle may be freely operated throughout the first third of its throw for disengaging the vehicle clutch without causing the operation of the power actuated piston and connected parts so that any gear at the time selected will remain undisturbed.

Assuming now that the clutch pedal 157' is rocked further forward from the end of the first third of its forward throw to the end of the second third of its forward throw, it will be seen that the lever 159 will, as shown in Figure 4 of the drawings, continue in its upward travel to coact with the valve pin 151 and lift the valve rod 147 to the end of its upward movement, when the stop lugs 148 will engage the top wall of the valve casing 140 for limiting the valve rod in its upward travel. As will be perceived, the slot 153 in the valve rod 147 will be moved out of communication with the port of the pipe 145 after which the wide portion 155 of the L-slot will be moved into communication with said port while the slot 156 of the valve rod will remain in communication with the port of the pipe 146. Accordingly, admission of air to the front end of the cylinder 121 through the pipe 145 will be cut off following which engine suction will be communicated through the pipe 143, through the L-slot and through the pipe 145 to the front end of the cylinder while air will be admitted through the slot 156 and through the pipe 146 to the rear end of the cylinder. Thus, the piston 129 will be shifted forwardly in the cylinder 121 to compress the spring 138 and swing the operating lever 80 forwardly to the end of its throw.

It will now be assumed that the clutch pedal 157' is rocked further forward from the end of the second third of its forward movement to the end of its throw. As shown in Figure 6, the lever 159 will be swung further upward from the position shown in Figure 4 to coact with the pin 151 and shift said pin upwardly within the valve rod 147 independently thereof to compress the spring 152, the spring accommodating the independent travel of the valve pin. Thus, the valve rod will be held at the limit of its upward travel while, however, the clutch pedal will be permitted to freely move forwardly from the end of the second third of its forward travel to the end of its throw.

Upon the release of the clutch pedal 157' said pedal will, of course, be immediately returned to normal position by the usual clutch spring while the spring 138 will urge the piston 129 rearwardly. Throughout the first third of the return travel of the clutch pedal, the valve pin 151 will, under the action of the spring 152, move downwardly within the valve rod 147 to follow the lever 159, the valve rod 147 in the meantime remaining at the limit of its upward throw. During the second third of the return travel of the clutch pedal, the valve rod 147 will move downwardly within the valve casing 140 to middle neutral position when, as previously described, air will be admitted to the front end of the cylinder 121 for breaking the partial vacuum therein while air will also be admitted to the rear end of the cylinder. As the clutch pedal then continues to move rearwardly for the last third of its return throw, the slot 156 in the valve rod 147 will be moved out of communication with the port of the pipe 146 for cutting off admission of air to the rear end of the cylinder, after which the wide portion 155 of the L-slot of the valve rod will move into communication with said port, the slot 153 of the valve rod in the meantime remaining in communication with the port of the pipe 145. Thus, air will be admitted to the front end of the cylinder 121 while engine suction will be communicated through the pipe 143, through the L-slot and through the pipe 145 to the rear end of said cylinder for shifting the piston 129 rearwardly to the end of its throw, after which, as the clutch pedal reaches the end of its return movement and the valve rod 147 comes to rest at the end of its downward travel, the valve slot 153 will move downwardly to communicate with the port of the pipe 146 along with the port of the pipe 144 for again admitting air to both ends of the cylinder. As will be appreciated, the piston 129 will, when shifted rearwardly within the cylinder 121 return the operating lever 80 to its initial position. The control valve is thus operable by the clutch pedal upon the forward throw thereof for admitting engine suction to the forward end of the power cylinder and coincidentally admitting air to the rear end of said cylinder so that the suction operated piston will be shifted forwardly for actuating the operating lever 80 while, upon the return throw of the clutch pedal, the valve is operable thereby for admitting suction to the rear end of the power cylinder and coincidentally admitting air to the front end of said cylinder so that the piston will be operated to return the operating lever to its initial position. The presence of the spring 138 in the cylinder is thus not imperative but said spring is, however, preferably employed as a matter of safety, the spring being of sufficient strength to alone return the piston 129 and lever 80 to normal position.

Assuming that the handle 38 has been pushed forwardly on the automatic side and low speed is active, it will now be seen that when the clutch pedal is actuated, the power actuated piston 129 will be caused to function for first neutralizing low speed automatically when second speed will be automatically rendered active. Upon the next actuation of the clutch pedal, second speed will be automatically neutralized, when high speed will be automatically rendered active. Upon the next actuation of the clutch pedal, high speed will be automatically neutralized and second sped again automatically rendered active, second and high speeds being thus alternated as long as the handle 38 is permitted to remain on the automatic side. When the handle is turned to neutral, however, either second speed or high speed, as the case may be, will, upon the next actuation of the clutch pedal, be automatically neutralized, as will now be understood, for neutralizing the transmission. Assuming that the handle 38 has been pushed forwardly on the manual side and low speed is active, it will now also be seen that, when the clutch pedal is next actuated, low speed will be automatically neutralized. Accordingly, low speed may be neutralized either manually or automatically or the power piston may, if so desired, be employed to supplement the hand control and the same is true of reverse. Furthermore, it is to be noted that as either high or second speed is rendered active, the clutch pedal may, if so desired, be employed to supplement the action of the power piston. As previously pointed out, approximately the first third of the forward throw of the rod 161 is idle so that the control valve will be moved to admit engine suction to the front end of the power cylinder just before the stop nut 162 engages the swiveled eye-bolt 160. Consequently, the piston 129 will then begin to move forwardly but, as will be perceived, the clutch pedal may, if so desired, be moved to engage the nut 162 with said eye-bolt, when forward pressure on the clutch pedal will be communicated to the lever 80 swinging the lever forwardly auxiliary to the power piston and, as will be appreciated, the clutch pedal may, should the control valve or power piston fail, be utilized alone for swinging said lever to render either second or high speed active or inactive.

Having thus described the invention, I claim:

1. In transmission control mechanism, rotatable digitated selectors having sockets in the fingers thereof and axially shiftable to dispose said sockets in circular alignment, shifting means movable by said selectors selectively for rendering a selected speed active, coupling means carried by said first-mentioned means and engageable in said sockets selectively when disposed in alignment for coupling said shifting means with said selectors selectively for movement thereby, and means for rotating said selectors to dispose said sockets selectively in position to receive said coupling means.

2. In transmission control mechanism, rotatable selectors having overlapping fingers forming a cylindrical surface and provided with sockets, the selectors being axially shiftable to dispose said sockets in circular alignment, a gear shifter, a coupling plunger carried by said shifter and spring actuated to ride against said surface, and means for rotating said selectors to engage said plunger in said sockets selectively.

3. In transmission control mechanism, a gear shifter, a spring actuated coupling plunger carried thereby, rotatable selectors having overlapping fingers provided with sockets and at all times forming a cylindrical surface against which the plunger rides when not engaged in one of said sockets, the selectors being axially shiftable to dispose said sockets in circular alignment, and means for rotating said selectors to engage said plunger in said sockets selectively.

4. In transmission control mechanism, a gear shifter, a rod slidably supporting said shifter, a selector movable for actuating said shifter, a detent carried by the shifter to coact with the rod, a plunger carried by the shifter to coact with the selector, a spring, and means for distributing the pressure of said spring to the detent and plunger, the selector being provided with a socket to receive the plunger for coupling the shifter with the selector for movement thereby, whereby the pressure of the spring on said detent will be relieved to facilitate movement of the shifter.

5. In a control mechanism for a change speed gearing having a plurality of speed ratios and shifting means therefor, rotatable means for selecting the shifting means for the different speed ratios, control means for moving said rotatable selecting means axially in opposite directions to render the speed ratios active or neutral, and means operable by the control means coincidental with the movement of the selecting means in one of its directions for moving the rotatable selecting means to a position selecting a future speed ratio.

6. In a control mechanism for a change speed gearing having a plurality of speed ratios and shifting means therefor, means for selecting the shifting means for the different speed ratios, control means for moving said selecting means axially in one direction to render a selected speed ratio active and in the opposite direction to render said selected speed ratio neutral, means operable by the control means coincidental with the movement of the selecting means to neutralize an active speed ratio for moving the selecting means to a position selecting a future speed ratio, and manually-controlled mechanism for disabling said last named means.

7. In a control mechanism for a change speed gearing having a plurality of speed ratios and shifting means therefor, means for alternately and successively rendering said speed ratios active and comprising rotatable means for selecting the shifting means for the different speed ratios, control means for moving said rotatable selecting means axially in one direction to render a selected speed ratio active and in the opposite direction to render said selected speed ratio neutral, and means operable by the control means during the movement of the selecting means to render a selected speed ratio active and neutral for moving the selecting means to a position selecting a future speed ratio.

8. In a control mechanism for a change speed gearing having a plurality of speed ratios and shifting means therefor, means for alternately and successively rendering said speed ratios active and comprising means for selecting the shifting means for the different speed ratios, control means for moving said selecting means axially in one direction to render a selected speed ratio active and in the opposite direction to render said selected speed ratio neutral, means operable by the control means during the movement of the selecting means to render a selected speed ratio active and neutral for moving the selecting means to a position selecting a future speed ratio, and manually-controlled means for disabling said last named means.

9. In a control mechanism for a change speed gearing having a plurality of speed ratios and shifting means therefor, rotatable means for selecting the shifting means of the different speed ratios, control means for moving said rotatable means axially in one direction to render a selected speed ratio active and in the opposite direction to render said selected speed ratio neutral, means for rotating said rotatable means, and means operable by the control means during the movement of the rotatable means to neutralize an active speed ratio for operating the means which rotates the rotatable means to thereby select a future speed ratio.

10. In a control mechanism for a change speed gearing having a plurality of speed ratios and shifting means therefor, rotatable means for selecting the shifting means of the different speed ratios, control means for moving said rotatable means axially in one direction to render a selected speed ratio active and in the opposite direction to render said selected speed ratio neutral, means for rotating said rotatable means, and means operable by the control means during the movement of the rotatable means to neutralize an active speed ratio for operating the means which rotates the rotatable means to thereby select a future speed ratio, said last named means including a ratchet mechanism for intermittently rotating the rotatable means.

11. In a control mechanism for a change speed transmission having two speed ratios each governed by shiftable means, means for alternately causing said speed ratios to become active and comprising rotatable means movable axially in opposite directions for causing said speeds to be active and neutral, selecting means for connecting the shiftable means of either speed ratio to the rotatable means, control means for axially moving the rotatable means, and means operable by the rotatable means during its movement in opposite directions to render a selected speed active and neutral for moving the selecting means to a position causing the shiftable means of the other speed ratio to be connected with the rotatable means.

12. In a control mechanism for a change speed transmission having two speed ratios each governed by shiftable means, means for alternately causing said speed ratios to become active and comprising means movable in opposite directions for causing said speeds to be active and neutral, selecting means for connecting the shiftable means of either speed ratio to the means movable in opposite directions, control means for the movable means, means operable by the movable means during its movement in opposite directions to render a selected speed active and neutral for moving the selecting means to a position to connect the shiftable means of the other speed ratio with the movable means, and manually-controlled mechanism for disabling said last named means.

13. In a control mechanism for a change speed transmission having shiftable means for rendering two speed ratios thereof active or neutral, means for alternately causing said speed ratios to become active, said means comprising rotatable means movable in opposite directions for controlling the shiftable means, selecting means for establishing a connection between the rotatable means and the shiftable means so that upon movement of the said rotatable means in one direction said speed ratios will be rendered active and in the other direction said speed ratios will be rendered neutral, and means operated by the controlling means during the movement of the movable means in neutralizing a selected speed ratio for automatically moving said selecting means to thereby select the other speed ratio.

14. In a control mechanism for a change speed transmission having a plurality of speed ratios governed by shiftable means, rotatable means for selecting the different speed ratio shiftable means and axially movable in opposite directions to render the speed active or neutral, control means for moving said last named means longitudinally in opposite directions, and selecting means operable by the control means during its movement to neutralize an active speed ratio to rotate said means to select a future speed ratio.

15. In a control mechanism for a change speed transmission having a plurality of speed ratios governed by shiftable means, rotatable means for selecting the different speed ratio shiftable means and axially movable in opposite directions to render the speed active or neutral, control means for moving said last named means longitudinally in opposite directions, selecting means operable by the control means during its movement to neutralize an active speed ratio to rotate said means to select a future speed ratio, and a manually-controlled means for disconnecting said selecting means from the control means.

16. In a control mechanism for a change speed transmission, a shiftable member for rendering a plurality of speeds active or neutral, means for controlling said shiftable member and comprising a pair of axially aligned elements adapted to cooperate with said shiftable member, said elements being simultaneously rotatable to select a speed and axially movable in opposite directions to render the selected speed active or neutral, means for moving said elements axially, and means operable by said last named means during the moving of said elements to cause the selected speed to be neutralized for automatically rotating said elements to select a future speed ratio.

17. In a control mechanism for a change speed transmission, a shiftable member for rendering a plurality of speeds active or neutral, means for controlling said shiftable member and comprising a pair of axially aligned elements adapted to cooperate with said shiftable member, said elements being simultaneously rotatable to select a speed and axially movable in opposite directions to render the selected speed active or neutral, means for moving said elements axially, means operable by said last named means during the moving of said elements to cause the selected speed to be neutralized for automatically rotating said elements to select a future speed ratio, and manually-controlled means for disabling said last named means.

18. In a control mechanism for a change speed transmission having a plurality of speed ratios, combined rotatable and longitudinally slidable means for selecting a speed ratio and rendering it active or neutral, a member for rotating the first named means to select a speed ratio, control means for longitudinally moving said first named means in opposite directions to render the selected speed ratio active and neutral, and means operable by the control means and including a ratchet mechanism for intermittently moving said member to rotate the first named means in a direction to alternately select the speed ratios.

19. In a control mechanism for a change speed transmission having a plurality of speed ratios, combined rotatable and longitudinally slidable means for selecting a speed ratio and rendering it active or neutral, a member for rotating the first named means to select a speed ratio, control means for longitudinally moving said first named means in opposite directions to render the selected speed ratio active and neutral, means operable by the control means and including a ratchet mechanism for intermittently moving said member to rotate the first named means in a direction to alternately select the speed ratios, and manually-controlled means for disabling the ratchet mechanism.

20. In a control mechanism for a change speed transmission, a shiftable member for rendering a plurality of speeds either active or neutral, control means for said member comprising two elements cooperating with said member and simultaneously rotatable for selecting a speed and axially slidable in opposite directions for rendering said selected speed active and neutral, actuating means for moving said elements axially, and means operable by said last named means when moving said elements to neutralize the selected speed to automatically rotate said elements to select another speed, said last named means including a rotatable member connected to the elements and a pawl connected to the actuating means.

21. In a control mechanism for a change speed transmission, a shiftable member for rendering a plurality of speeds either active or neutral, control means for said member comprising two elements cooperating with said member and simultaneously rotatable for selecting a speed and axially slidable in opposite directions for rendering said selected speed active and neutral, two oppositely movable levers for moving said elements axially, a rotatable member connected to said elements, and a pawl connected to one of the levers and cooperating with the rotatable member for intermittently rotating it.

22. In a control mechanism for a change speed transmission, a shiftable member for rendering a plurality of speeds either active or neutral, control means for said member comprising two elements cooperating with said member and simultaneously rotatable for selecting a speed and axially slidable in opposite directions for rendering said selected speed active and neutral, two oppositely movable levers for moving said elements axially, a rotatable member connected to said elements, a pawl connected to one of the levers and cooperating with the rotatable member for intermittently rotating it, and manual means for disconnecting the pawl from the rotatable member.

23. In a control mechanism for a change speed gearing having a plurality of speed ratios and shifting means therefor, rotatable means movable axially in opposite directions for selecting the shifting means of the different speed ratios and rendering them active and neutral, control means comprising two oppositely movable levers connected to the rotatable means, and means for intermittently rotating the rotatable means and comprising a ratchet mechanism connected to be operated by one of said levers.

24. In a control mechanism for a change speed gearing having a plurality of speed ratios and shifting means therefor, rotatable means movable axially in opposite directions for selecting the shifting means of the different speed ratios and rendering them active and neutral, control means comprising two oppositely movable levers connected to the rotatable means, means for intermittently rotating the rotatable means and comprising a ratchet mechanism connected to be operated by one of said levers, and manual means for disabling the ratchet mechanism.

25. In a control mechanism for a change speed transmission having a plurality of speed ratios and shiftable means for controlling said ratios, a single manually controlled means for directly moving one of the shiftable means to render active one of the speed ratios, means separate from the single manually-controlled means for alternately selecting and moving the shifting means for the other speed ratios, and means operable by the manually-controlled means when in a position wherein the speed ratio controlled thereby is in neutral for rendering said last named means operable or inoperable.

26. In a control mechanism for a change speed transmission having a plurality of speed ratios and shiftable means for controlling said ratios, manual means for directly moving one of the shiftable means to render active one of the speed ratios, and means separate from the manual means for alternately selecting and moving the shifting means for the other speed ratios, said last named means including means for moving the manually-shiftable means to a position to render its speed ratio neutral in the event it is active.

27. In a control mechanism for a change speed transmission having a plurality of speed ratios and shiftable means for controlling said ratios, manual means for directly moving one of the shiftable means to cause one of the speed ratios to be active, means separate from the manual means for alternately selecting and moving the shifting means for other speed ratios to render them active and neutral including means for neutralizing said manually-controlled speed ratio in the event it is active, and means operable by the manual means when placed in a position to cause the speed controlled thereby to be active for rendering the alternate selecting and movable means operable.

28. In a control mechanism for a change speed transmission having a plurality of speed ratios and shiftable means for controlling said ratios, a single manually controlled means for directly moving one of the shiftable means to cause one of the speed ratios to be active, means separate from the single manually-controlled means for alternately selecting and moving the shifting means for other speed ratios to render them active and neutral including means for neutralizing said manually-controlled speed ratio in the event it is active, and means operable by the manually-controlled means when placed in a position wherein the speed controlled thereby is in either active or neutral for causing the alternate selecting and movable means to be operable.

29. In a control mechanism for change speed transmission having a plurality of speed ratios and shiftable means for controlling said ratios, manually-controlled means for directly moving one of the shiftable means to cause one of the speed ratios to be active or neutral, means separate from the manually-controlled means for alternately selecting and moving the shifting means for the other speed ratios to render them active and neutral including means for neutralizing said manually-controlled speed ratio in the event it is active, and means operable by the manually-controlled means when placed in one position to cause the speed controlled thereby to be either active or neutral to thereby render the alternate selecting means operable and in another position to cause the alternate selecting means to be inoperable.

30. In a control mechanism for a change speed transmission having a plurality of speed ratios and shiftable means for controlling said ratios, manually-controlled means for directly moving the shiftable means for one of said speed ratios to render it active and neutral, means for selecting either of said other speed ratios and moving its shifting means to render said selected speed active or neutral, control means independent of the manually-controlled means for operating said last named means, and means operable by said control means for neutralizing the speed ratio controlled by the manually-controlled means in the event it is active when the control means is operated.

31. In a control mechanism for a change speed transmission having a shiftable member for one forward speed and a shiftable member for other forward speeds, manually-controlled means for directly moving said first named shiftable member to render the one forward speed active or neutral, means operable independently of the manually-controlled means for controlling the second named shiftable member and including means for selecting either of said other forward speeds and rendering it active or neutral, and means for neutralizing said one forward speed by the independently operable means for the other speeds and prior to rendering either of said other speeds active.

32. In a control mechanism for a change speed transmission having a plurality of speed ratios and shiftable means for controlling said ratios, manual means for moving the shiftable means for one of said speed ratios to render it active and neutral, means for alternately causing said other speed ratios to be active and neutral, said means comprising a means movable in opposite directions for rendering the speeds active and neutral and selecting means for connecting either of the shiftable means for said speeds to the movable means, means operable by the control means during its actuation of the movable means to render a selected speed active and neutral for moving the selecting means to select another speed ratio, and means operable by the manual means for rendering said last named means operable or inoperable.

33. In a control mechanism for a change speed transmission having a plurality of speed ratios and shiftable means for controlling said ratios, manual means for controlling one of said speeds to thereby render it active and neutral, combined rotatable and longitudinally slidable means for selecting either of the other speed ratios and rendering it active or neutral, means operable independently of the manual means for moving said first named means in opposite directions, means operable by the control means for rotating said first named means to automatically select one or the other of the speed ratios, and means operable by the control means for neutralizing the manually-controlled speed ratio in the event that such speed is active and prior to the rendering of either of said other speeds active.

34. A change speed transmission control mechanism for rendering active and neutral the different speeds of a change speed gearing having a shiftable member for low speed and a shiftable member for second and high speeds, said control mechanism comprising a manually-actuated means for shifting said member controlling the low speed to thereby render said speed active or neutral, means for shifting said second and high speed shiftable member to render either of said speeds active or neutral, said last named means embodying rotatable means for selecting the desired speed, means operable independently of the manual means for shifting said second and high speed shiftable member, and means operable by the said last named means for automatically rotating the selecting means to alternately select the second or high speed when the means for operating the second and high speed shifting members is actuated.

35. In a control mechanism for a change speed transmission having reverse, low, second and high speed ratios and shiftable means for controlling said ratios, manual means for directly moving the shiftable means for the reverse speed ratio and the low speed ratio to cause said speed ratios to be either active or neutral, means separate from the manual means for alternately selecting and moving the shifting means for the second and high speed ratios for rendering them active and neutral including means for neutralizing the low or reverse speed ratios in the event either is active, and means operable by the manual means for causing the alternate selecting means to be either operable or inoperable.

36. In a control mechanism for a change speed transmission, a shiftable member for controlling a plurality of speeds, means for selecting one of said speeds and moving its shiftable member to cause said speeds to be either active or neutral, power means including a manual control member for operating said last means, and means interconnecting said manual control member and said means for selecting and moving the shiftable member for moving said means by the manual control member.

37. In a control mechanism for a change speed transmission, a shiftable member for controlling a plurality of speeds, means for selecting one of said speeds and moving its shiftable member to cause said speed to be either active or neutral, power means for operating said last named means, a manually-actuated member for controlling the power means, and a lost motion connection between the manually-actuated member and the selecting and moving means for manually operating said selecting and moving means in the event of either partial or complete failure of the power means.

38. In a control mechanism for a change speed transmission, a shiftable member for controlling a plurality of speeds, means for selecting one of said speeds and moving its shiftable member to cause said speed to be either active or neutral, fluid power means for operating said last named means, a valve for controlling the fluid power means, a clutch pedal for actuating the valve, and a lost motion connection between the clutch pedal and the selecting and moving means for directly operating said selecting and moving means by the clutch pedal in the event of either partial or complete failure of the power means.

39. In a control mechanism for a change speed transmission having a plurality of speed ratios and shiftable means for controlling said ratios, means for selecting said shiftable means and rendering the speed ratios controlled thereby either active or neutral and comprising a pair of selecting members movable in opposite directions to render the selected speed ratio active or neutral, means including a power actuated mechanism for moving said members in opposite directions, a manual control member for said power means, and means inter-connecting said manual control member and the oppositely movable members for manually moving them in opposite directions in the event of partial or complete failure of the power means.

40. In a control mechanism for a change speed gearing having a plurality of speed ratios and shifting means therefor, means for selecting the shifting means for the different speed ratios, control means for moving said selecting means axially in opposite directions to render a selected speed ratio either active or neutral and including two levers simultaneously movable in opposite directions, power means for operating said control means, a manually-actuated member for controlling the power means, and a lost motion connection between the manually-actuated member and one of the levers for manually operating said control means in the event of either partial or complete failure of the power means.

41. In a control mechanism for a change speed transmission having a longitudinally movable member for changing the speed ratios thereof, two selecting and shifting members having overlapping fingers presenting a smooth curved surface, each of said fingers being provided with a recess, detent means carried by said longitudinally movable member cooperating with the curved surface, means for simultaneously rotating said selecting and shifting members to place the detent in either of said finger recesses, and means for moving the selecting and shifting members in opposite directions.

42. In a control mechanism for selecting one of a plurality of speed ratios of a change speed transmission and rendering said speed active or neutral, said mechanism comprising two axially aligned relatively slidable elements having axially extending overlapping fingers presenting a curved surface, detachable connecting means cooperating with the curved surface and adapted to connect said fingers with the shifting means for the speed ratios, means for simultaneously rotating said elements to select and connect thereto the shifting means of a desired speed ratio, and means for moving said elements in opposite directions to render the selected speed active and neutral.

43. A control mechanism for selecting one of a plurality of speed ratios of a change speed transmission and rendering said speed ratios active or neutral, said mechanism comprising two relatively axially slidable and simultaneously rotatable elements provided with axially extending fingers in overlapping relation, means cooperating with the fingers for detachably connecting the elements to the shifting means of the speed ratios, means for rotating said elements to selectively connect a predetermined speed ratio to one of said elements, and means for sliding said elements in opposite directions for rendering said selected speed active and neutral.

44. In a control mechanism for a change speed transmission having a longitudinally movable member for changing the speed ratios thereof, two selecting and shifting members having overlapping fingers forming a cylindrical surface, cooperating means on the fingers and the longitudinally movable member for connecting them together for simultaneous movement, means for rotating the selecting and shifting members to selectively connect the fingers to the longitudinally movable member by said last named means, and means for moving the selecting and shifting members in opposite directions to thereby cause the speed ratios to be rendered either active or neutral.

45. In a control mechanism for a change speed transmission having a longitudinally movable member for changing the speed ratios thereof, two selecting and shifting members having overlapping fingers forming a cylindrical surface, said fingers being provided with recesses, means carried by the longitudinally movable member and adapted to cooperate with the recesses of the fingers for detachably connecting the said member to the selecting and shifting members, means for rotating the selecting and shifting members to selectively connect the fingers to the longitudinally movable member by said last named means, and means for moving the selecting and shifting members in opposite directions to thereby cause the speed ratios to be rendered either active or neutral.

46. In a control mechanism for a change speed transmission having a longitudinally movable member for changing the speed ratios thereof, two selecting and shifting members having overlapping fingers forming a cylindrical surface, said fingers being provided with recesses, a yieldable detent carried by the longitudinally movable member for engagement with the cylindrical surface and adapted to cooperate with the recesses of the fingers, means for rotating the selecting and shifting members to place said detent in a selected recess, and means for moving the selecting and shifting members in opposite directions to thereby cause the speed ratios to be rendered either active or neutral.

47. In a control mechanism, a support, a longitudinally shiftable member, detent means between the shiftable member and the support, a movable member having a recess therein, a plunger for cooperating with the recess and adapted to connect the movable member to the shiftable member, and a yieldable connection between the detent and the plunger and adapted to apply a greater pressure to the detent means when the movable member is in a position where the plunger is not cooperating with the recess than when said plunger lies in the recess.

48. In a control mechanism, a support, a longitudinally shiftable member, detent means between the shiftable member and the support, a movable member having a curved surface provided with a recess, a plunger carried by the shiftable member and adapted to cooperate with the recess and the curved surface of the movable member to thereby permit the shiftable member to be connected to and disconnected from the movable member, and a connection including a spring between the detent means and the plunger, said spring being so related to the detent means and the plunger as to exert a greater pressure on the detent means when the plunger bears on the curved surface than when said plunger engages the recess.

49. In a control mechanism for a change speed gearing having a plurality of speed ratios and shifting means therefor, rotatable means for selecting the shifting means for the different speed ratios and comprising two members capable of movement axially in opposite directions, control means for moving the members of said rotatable selecting means axially in opposite directions, and means operable by the control means coincidental with the movement of the selecting means in one direction to thereby rotate the rotatable means to a position selecting a future speed ratio.

50. In a control mechanism for a change speed gearing having a plurality of speed ratios and shifting means therefor, rotatable means for selecting the shifting means for the different speed ratios and comprising two members capable of movement axially in opposite directions, control means for moving the members in opposite directions to render the speed ratios active or neutral, and means operable by the control means coincidental with the movement of the two members in one of their directions of movement for selecting an inactive speed ratio, said selected inactive speed ratio being rendered active by the movement of the two members in their other directions of movement.

51. In a control mechanism for a change speed gearing having a plurality of speed ratios and shifting means therefor, rotatable means for selecting the shifting means for the different speed ratios and comprising two members capable of movement axially in opposite directions, control means for moving the members in opposite directions to render the speed ratios active or neutral, and means operable by the control means coincidental with the movement of the two members in one of their directions of movement to neutralize an active speed ratio to thereby select an inactive speed ratio, said selected inactive speed ratio being rendered active by the movement of the two members in their other directions of movement.

52. In a control mechanism for a change speed transmission having a plurality of speed ratios and shiftable means for controlling said ratios, rotatable and longitudinally movable manual means, for directly moving one of the shiftable means to render active and neutral one of the speed ratios by a longitudinal movement of the manual means, means for alternately selecting and moving the shifting means for the other speed ratios, and means operable by rotation of the manual means when it is in a position wherein the speed ratio it controls is in neutral for rendering said last named means operable or inoperable.

53. In a control mechanism for a change speed transmission, a shiftable member for controlling a plurality of speed ratios, means for selecting said speed ratios, means for moving the shiftable member to cause said speed ratios to be either active or neutral, power means including a control member for operating said moving means for the shiftable member, a manual member for actuating the control member for the power means, and a mechanical connection between said manual member and the moving means whereby the manual member is capable of moving the shiftable means and also actuating the control member for the power means to cause operation of the power means to move the shiftable means simultaneously with the manual movement thereof, said manual means, in the event of failure of the power means, being capable of directly moving the shiftable means.

54. In a control mechanism for a change speed transmission, a shiftable member for controlling a plurality of speed ratios, means for selecting said speed ratios, means for moving the shiftable member to cause said speed ratios to be either active or neutral, fluid power means including a valve for operating said moving means for the shiftable member, a pedal for controlling said valve, and a mechanical connection between said pedal and the moving means whereby the pedal will move the shiftable means and also place the valve in a position to cause operation of the power means to move the shiftable means.

55. In a control mechanism for a change speed transmission, a shiftable member for controlling a plurality of speed ratios, rotatable means for selecting said speed ratios and comprising two axially movable members, means for moving said members in opposite directions to cause the shiftable member to render the selected speed ratio either active or neutral, power means including a control member for operating said moving means for the two members, a manual member for actuating the control member for the power means, and a mechanical connection between said manual member and the moving means for the two members whereby the manual member is capable of moving the shiftable means and also actuating the control member to a position to cause operation of the power means to move the shiftable means.

56. In a control mechanism for a change speed transmission, a shiftable member for controlling a plurality of speed ratios, rotatable means for selecting said speed ratios and comprising two axially movable members, means for moving said members in opposite directions to cause the shiftable member to render the selected speed ratio either active or neutral, fluid power means including a valve for operating said moving means for the two members, a pedal for controlling said valve, and a mechanical connection between said pedal and the moving means whereby movement of the pedal will move the shiftable means and also place the valve in a position to cause operation of the power means to move the shiftable means.

57. In a control mechanism for a change speed gearing having a shiftable member for low speed and a shiftable member for second and high speeds, a manually-actuated means for directly shifting said member controlling the low speed to thereby render said speed active or neutral, means for alternately selecting and moving the shiftable member for the second and high speeds to render them active or neutral, said last named means including means for moving the shiftable member for the low speed to a position to neutralize low speed in the event it is active, and means operatively connected to and operable by the manually-actuated means when moved to a position to cause the low speed to be active to thereby cause the alternately selecting and moving means of the second and high speed ratios to be operable whereby subsequent operation of the alternately selecting and moving means will result in the low speed being neutralized prior to rendering active one of the speeds controlled by the alternately selecting and moving means.

58. In a control mechanism for a change speed gearing having two spaced apart shifting forks mounted on a support for longitudinal movement to render the speed ratios active or neutral, a selecting and shifting means for the shifting forks positioned between said forks and comprising two relatively axially slidable and simultaneously rotatable elements provided with axially extending fingers in overlapping relation in all axial positions of said elements, means cooperating with the fingers for detachably connecting the elements to the shifting forks, means for rotating said elements to selectively connect one of the shifting forks to one of said elements, means for sliding said elements in opposite directions to move said selected shifting fork, and an interlocking member pivoted to the support and positioned between the shifting forks and adjacent the two elements for preventing the shifting forks from being simultaneously moved from their neutral positions.

59. A control mechanism for selecting one of a plurality of shifting means of a change speed transmission and rendering the speed ratios thereof active and neutral, said mechanism comprising two relatively axially slidable and simultaneously rotatable elements provided with axially extending fingers in overlapping relation in all axial positions of said elements, means cooperating with the fingers for detachably connecting the elements to the shifting means of the speed ratios, means for rotating said elements to selectively connect a predetermined speed ratio to one of said elements, means for sliding said elements in opposite directions for rendering said selected speed active or neutral, and cooperating abutments on said elements and the shifting means for moving said shifting means to a neutral position irrespective of the rotative position of said elements.

60. In a control mechanism for a change speed transmission having a longitudinally movable member for changing the speed ratios thereof, two selecting and shifting members having overlapping fingers forming a cylindrical surface, said fingers being provided with recesses, a yieldable detent carried by the longitudinally movable member for engagement with the cylindrical surface and adapted to cooperate with the recesses of the fingers, means for rotating the selecting and shifting members to place said detent in a selected recess, said detent riding on the cylindrical surface during rotation of the members, means for moving the selecting and shifting members in opposite directions to thereby cause the speed ratios to be rendered either active or neutral, and means forming annular shoulders on said selecting and shifting members for engaging and moving the longitudinal moving member to a neutral position irrespective of the rotative position of said selecting and shifting members.

61. In a control mechanism for a change speed gearing having a longitudinally movable member for changing the speed ratios thereof, two selecting and shifting members, a rod for supporting said members, each of said members comprising axially extending fingers positioned in overlapping relation in all axial positions of said elements, a collar provided on each set of fingers and means forming a recess in at least one of said fingers of each selecting and shifting member, detent means carried by said longitudinally movable member, means for simultaneously rotating said selecting and shifting members to place the detent means in either of said finger recesses, and means for moving the selecting and shifting members axially in opposite directions, said detent means being adapted to ride on the surface of said fingers during the rotation of the selecting and shifting members and in all axial positions thereof.

62. In change speed gearing control, rotatable selectors provided with sockets, means for axially shifting said selectors, said selectors when axially shifted in one direction effecting relative disposition of said sockets in a common selection field, a gear shifter, a single coupling member carried by said shifter and adapted for cooperation with said sockets when in said field, and means for rotating said selectors for selective reception by said sockets of said coupling member whereby return axial shift of said selectors will cause movement of said gear shifter and cause the corresponding speed to be operative.

63. In a change speed gearing control mechanism, rotatable selectors provided with sockets, means for moving the selectors axially for placing said sockets in a common operative field and for moving said sockets out of said field, a gear shifter, a single coupling member carried by said shifter and adapted for selective cooperation with said sockets when in the common operative field, and means for rotating said selectors for positioning said sockets for selective cooperation with said single coupling member.

64. In change speed gearing control, selector members provided with sockets, a gear shifter, a single coupling member carried by said shifter, means for relatively moving said selectors in one direction for locating said sockets in a common selection field for selectively receiving said coupling member, and means for moving said selectors in a different direction for movement of the coupled shifter to effect the desired gear speed setting.

65. In a change speed gearing control mechanism, selector members provided with sockets, a gear shifter, a single coupling member carried by said shifter, means for relatively moving said selectors in one direction for locating said sockets for selective cooperation with said single coupling member, and means for moving said selectors together in a different direction for effecting the shifting of said gear shifter.

66. A control mechanism for a change speed gearing, said mechanism comprising gear shifter means and two relatively axially slidable elements provided with axial extensions in overlapping relation, cooperating means on the extensions and the shifter means for selectively connecting them together for simultaneous movement, means for selectively causing said cooperating means to assume its operative positions, and means for moving said slidable elements in opposite directions for rendering the selected speed ratio active.

67. A control mechanism for selecting one of a plurality of speed ratios of a change speed transmission and for rendering said speed ratios active or neutral, said mechanism comprising gear shifter means and two relatively axially slidable elements provided with axial extensions in overlapping relation, cooperating means on the extensions and the shifter means for selectively connecting them together for simultaneous movement, means for selectively causing said cooperating means to assume its operative positions, and means for moving said slidable elements in opposite directions for rendering said selected speed active or neutral.

68. In a control mechanism for a change speed transmission having a plurality of gear sets of different speed ratios and shifting means for said gear sets, a single manual control member, means operable by a movement in one direction of said manual member for causing certain of said gear sets to be operative or inoperative, actuating means for causing other of said gear sets to be operative or inoperative, and means operative by a different movement of the single manual member for causing said actuating means to control said other gear sets when actuated.

69. In a control mechanism for a change speed transmission having a plurality of gear sets of different speed ratios and shifting means for said gear sets, a single manual control member, means operable by a movement in one direction of said manual member for causing certain of said gear sets to be operative or inoperative, manually-controlled power means for causing other of said gear sets to be operative or inoperative, and means operative by a different movement of the single manual member for permitting said power means to control said other gear sets when said power means is operated.

70. In a control mechanism for a change speed gearing having a shifting member for an element thereof, a hand control member, means operable by the hand control member for moving said shifting member to different positions, a foot pedal, power-operated means for shifting said shifting member, and means for controlling said power means by the foot pedal, said shifting member being capable of being shifted by the hand control member independently of the power-operated means in the event of power failure, said power-operated means being normally capable of shifting said shifting member without assistance from said hand control member and in the event of partial power failure said hand and said power-operated means being capable of supplementing each other to shift the shiftable member.

71. In a control mechanism for a change speed gearing having a shifting member for an element thereof, a hand control member, means operable by the hand control member for moving said shifting member to its operative and inoperative positions, a foot pedal, power-operated means for shifting said shifting member to its inoperative position, and valve means operable by the foot pedal for controlling said power means, said shifting member being capable of being shifted to its inoperative position by the hand control member independently of the power-operated means in the event of power failure, said power-operated means being normally capable of shifting said shifting member to its inoperative position without assistance from said hand control member and in the event of partial power failure said hand and said power-operated means being capable of supplementing each other to shift the shiftable member to its inoperative position.

GLENN T. RANDOL.